US009139715B2

(12) United States Patent (10) Patent No.: US 9,139,715 B2
Sundararaman et al. (45) Date of Patent: Sep. 22, 2015

(54) COATING OF METAL PIGMENTS USING PHOSPHONIC ACID-BASED COMPOUNDS

(75) Inventors: Anand Sundararaman, Allentown, PA (US); Yungwan Kwak, Breinigsville, PA (US); Craig Keemer, Reading, PA (US); John Buchala, Tamaqua, PA (US); Mary Kate Thomas, Schuylkill Haven, PA (US); Chang Xu, Allentown, PA (US); Parfait Jean Marie Likibi, Mount Pleasure, SC (US)

(73) Assignee: Silberline Manufacturing Co., Inc., Tamaqua, PA (US)

(*) Notice: Subject to any disclaimer, the term of this patent is extended or adjusted under 35 U.S.C. 154(b) by 417 days.

(21) Appl. No.: 13/617,295

(22) Filed: Sep. 14, 2012

(65) Prior Publication Data

US 2014/0076201 A1 Mar. 20, 2014

(51) Int. Cl.
*C09C 3/00* (2006.01)
*C09C 1/62* (2006.01)
*C09C 1/64* (2006.01)
*C08K 5/5333* (2006.01)
*C09D 5/36* (2006.01)
*C09C 3/08* (2006.01)
*C09C 3/10* (2006.01)
*C09C 3/06* (2006.01)

(52) U.S. Cl.
CPC ............... *C08K 5/5333* (2013.01); *C09C 1/62* (2013.01); *C09C 1/64* (2013.01); *C09C 1/644* (2013.01); *C09C 1/648* (2013.01); *C09D 5/36* (2013.01); *C09C 3/006* (2013.01); *C09C 3/063* (2013.01); *C09C 3/08* (2013.01); *C09C 3/10* (2013.01)

(58) Field of Classification Search
CPC ............ C09C 1/62; C09C 1/64; C09C 1/644; C09C 1/648; C09C 3/006; C09C 3/08; C09C 3/10; C09C 3/063; C09D 5/36; C08K 5/5333
USPC ........ 106/14.05, 403, 404, 503; 428/403, 407
See application file for complete search history.

(56) References Cited

U.S. PATENT DOCUMENTS

| 4,213,886 | A | 7/1980 | Turner |
|---|---|---|---|
| 4,219,674 | A | 8/1980 | Wolfers et al. |
| 4,350,535 | A | 9/1982 | Ishijima et al. |
| 4,565,716 | A | 1/1986 | Williams, Jr. et al. |
| 4,717,424 | A | 1/1988 | Wilfinger et al. |
| 5,057,156 | A | 10/1991 | Kuwajima et al. |
| 5,091,451 | A | 2/1992 | Kahle, II et al. |
| 5,429,674 | A | 7/1995 | Lamers et al. |
| 5,776,555 | A | 7/1998 | Wagland et al. |
| 5,883,206 | A | 3/1999 | Ittel et al. |
| 6,063,637 | A | 5/2000 | Arnold et al. |
| 6,127,154 | A | 10/2000 | Mosbach et al. |
| 6,379,599 | B1 | 4/2002 | Vaidya et al. |
| 6,624,227 | B1 | 9/2003 | Bruylants et al. |
| 6,759,488 | B1 | 7/2004 | Sellergren et al. |
| 6,863,718 | B2 | 3/2005 | Lamborn et al. |
| 7,172,812 | B2 | 2/2007 | Greiwe et al. |
| 7,462,394 | B2 | 12/2008 | Taylor et al. |
| 7,479,323 | B2 | 1/2009 | Rathschlag et al. |
| 2003/0097957 | A1 | 5/2003 | Lamborn et al. |
| 2009/0009852 | A1 | 1/2009 | Honeyman et al. |
| 2009/0312505 | A1 | 12/2009 | Matyjaszewski et al. |
| 2009/0324839 | A1 | 12/2009 | Klippel et al. |
| 2010/0027192 | A1* | 2/2010 | Perry et al. ............... 361/323 |
| 2010/0273906 | A1 | 10/2010 | Matyjaszewski et al. |
| 2010/0273949 | A1 | 10/2010 | Jakubowski et al. |

FOREIGN PATENT DOCUMENTS

| GB | 1546874 | * | 5/1979 |
|---|---|---|---|
| WO | 2008/135209 | | 11/2008 |
| WO | WO 2009072905 A2 | * | 6/2009 |

OTHER PUBLICATIONS

Babu et al., "Grafting of Poly(methyl methacrylate) Brushes from Magnetite Nanoparticles Using a Phosphonic Acid Based Initiator by Ambient Temperature Atom Transfer Radical Plymerization (ATATRP)" Nanoscale Res Lett, vol. 3, pp. 109-117, 2008.
Carlier et al., "Functional Plymers Supported on Porous Silica: II. Radical Polymerization of Vinylbenzyl Chloride From Grafted Precursors" Reactive Polymers, vol. 16, pp. 115-124, 1991.
Feng et al., "Photoinitiated Synthesis of Mixed Polymer Brushes of Polystyrene and Poly(methyl methacrylate)" Macromolecules, vol. 37, pp. 9525-9537, 2004.
Fulghum et al., "Grafting Hole-Transport Precursor Polymer Brushes on ITO Electrodes: Surface-Initiated Polymerization and Conjugated Polymer Network Formation of PVK" Macromolecules, vol. 41, pp. 5681-5687, Jul. 15, 2008.
Gawalt et al., "Enhanced Bonding of Alkanephosphonic Acids to Oxidized Titanium Using Surface-Bound Alkoxyzirconium Complex Interfaces" Langmuir, vol. 15, pp. 8929-8933, Oct. 7, 1999.
Hoyt-Lalli, "Sythesis of Functionalized Polysiloxanes and Investigation of Highly Filled Thermally Conductive Microcomposites" Dissertation submitted to the Faculty of Virginia Polytechnic Institute and State University, 230 pgs., Aug. 5, 2002.

(Continued)

*Primary Examiner* — Anthony J Green
(74) *Attorney, Agent, or Firm* — Hamre, Schumann, Mueller & Larson, P.C.

(57) ABSTRACT

A coated metal pigment that has excellent passivation, dispersion and adhesion properties, a method for producing the coated metal pigment and a coating composition that includes the coated metal pigment are described. The disclosed method generally involves the use of a compound with the following formula (A)

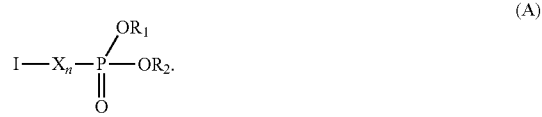

18 Claims, 15 Drawing Sheets

(56) References Cited

OTHER PUBLICATIONS

Kim et al., "Ferrocene Functional Polymer Brushes on Indium Tin Oxide via Surface-Initiated Atom Transfer Radical Polymerization" Langmuir, vol. 26, No. 3, pp. 2083-2092, Dec. 7, 2009.

Maliakal et al., "Inorganic Oxide Core, Polymer Shell Nanocomposite as a High K Gate Dielectric for Flexible Electronics Applications" J. Am. Chem. Soc., vol. 127, pp. 14655-14662, 2005.

Minet et al., "Surface-Initiated ATRP of PMMA, PS and diblock PS-b-PMMA Copolymers From Stainless Steel Modified by 11-(2-bromoisobutyrate)-undecyl-1-phosphonic acid" Journal of Colloid and Interface Science, vol. 332, pp. 317-326, 2009.

Minet et al., "Preparation of a polyacrylonitrile/multi-walled carbon nanotubes composite by surface-initiated atom transfer radical polymerization on a stainless steel wire for solid-phase microextraction." J. Chromatography A vol. 1217, pp. 2758-2767, 2010.

Prucker et al., "Synthesis of Poly(styrene) Monolayers Attached to High Surface Area Silica Gels through Self-Assembled Monolayers of Azo Initiators" Macromolecules, vol. 31, pp. 592-601, Jan. 22, 1998.

Raghuraman et al., "Grafting of PMMA Brushes on Titania Nanoparticulate Surface Via Surface-Initiated Conventional Radical and 'Controlled' Radical Polymerization (ATRP)" J. Nanopart. Res., vol. 10, pp. 415-427, 2008.

Tsubokawa et al., "Graft Polymerization of Vinyl Monomers from Inorganic Ultrafine Particles Initiated by Azo Groups Introduced onto the Surface" Polymer Journal, vol. 22, No. 9, pp. 827-833, 1990.

United Kingdom Search Report for United Kingdom Application No. GB1316051.0, mailed Mar. 7, 2014, 3 pgs.

* cited by examiner

COATING OF METAL PIGMENTS USING PHOSPHONIC ACID-BASED COMPOUNDS

FIELD

The present disclosure relates generally to coated pigments and systems including the coated pigments, and particularly, to the design of polymer coated pigments and methods of producing the coated pigments, and to the design of systems including the coated pigments.

BACKGROUND

Effect pigments are used to introduce metallic or pearlescent luster to a wide range of products such as paints, coatings, inks, and plastics. Good passivation and dispersion of the metallic effect pigments are desirable for optimal performance of such products.

Metallic effect pigments, especially those that include aluminum, bronze, iron oxide and steel pigments, can react with water, acids or bases in coating or ink formulations. In the instance where the metallic effect pigments include iron oxide, a thermite reaction can occur, leading to the loss of physical properties. Passivation such as waterborne passivation of metallic effect pigments, particularly aluminum, bronze and steel pigments, can improve the durability of the pigments and their aesthetic effects. In some of the disclosed approaches, organophosphorous compounds are used during the passivation of metallic effect pigments.

Passivation of these pigments by the addition of phosphonic acid can prevent such losses in physical properties.

For example, U.S. Pat. No. 4,717,424 discloses passivation with phosphonic or phosphinic acids where the R group has a terminal COOH carboxylic acid group.

U.S. Pat. No. 4,565,716 discloses the passivation of metallic pigments using acidic phosphate esters, phosphonic acids or acidic phosphonic esters.

U.S. Pat. No. 7,462,394 discloses aluminum passivation from polymer containing both phosphoric or phosphonic acid groups and another substituent chosen from nitro, pyridine, or phenolic hydroxyl groups.

U.S. Pat. No. 5,091,451 discloses aluminum passivation from a compound which is a reaction product of an alpha-aminomethylene phosphonic acid and a compound containing at least one epoxy group.

U.S. Pat. No. 5,429,674 discloses passivation from a compound which is a reaction product of an N-acyl aminomethylene phosphonates.

While conventionally used organophosphorous reagents may impart chemical stability to the metallic pigment so as to address passivation, such reagents do not address the issues related to dispersion of the metallic effect pigments.

Optimal performance of products including metallic effect pigments also require the metallic effect pigments to be well dispersed. Well dispersed metallic effect pigments are desirable in the products to prevent agglomeration of the pigments, improve hiding and enhance aesthetics. Efforts have been made to encapsulate the metallic flakes with a polymer coating to improve dispersion of pigment flakes.

U.S. Pat. No. 7,479,323 for instance discloses pre-treating aluminum flakes with polyvinyl alcohol to improve the dispersion of pigments in aqueous media.

U.S. Pat. No. 4,213,886 discloses procedures to modify aluminum flakes with monoethylenically unsaturated silane.

However, while the incorporation of functional monomers into the polymer chains may improve the dispersion/compatibility of pigments inside an applied media, these functional groups may adversely affect the chemical resistance of the flakes.

In general, a combination of both good passivation and dispersion of metallic pigments has been difficult to achieve.

SUMMARY

A coated pigment that has excellent passivation, dispersion and adhesion properties, a method for producing the coated metal pigment and a coating composition that includes the coated metal pigment are described. The team "coated pigment" herein means a pigment that is fully encapsulated or partially encapsulated with a coating. The disclosed coated pigment can include a pigment that is made of a metal, a metal oxide or mixed metal oxides.

The disclosed method involves the use of a compound that has two functionalities: a phosphonate or phosphonic functionality and a polymerization initiator functionality. The phosphonate or phosphonic functionality is for attaching or reacting the compound to the surface of the metal pigment through hydrogen or covalent bonding. The phosphonate or phosphonic functionality along with the alkyl chain or tether provides the passivation properties. The initiator functionality provides a center for polymer growth through controlled/living radical polymerization or conventional radical polymerization. The nature of the polymer growth can be varied from highly hydrophilic to highly hydrophobic. Alternatively, a combination of hydrophilic and hydrophobic monomers can be used to adjust the hydrophilicity/hydrophobicity balance based on a predetermined requirement, such as the nature of the application or a solubility parameter.

DETAILED DESCRIPTION

A coated pigment including a polymer coating having excellent passivation and dispersion properties, a method for producing the coated pigment and a coating composition that includes the coated pigment are described. The disclosed method generally involves immobilizing a polymerization initiator onto the surface of the pigment and polymerizing from initiator sites of the initiator anchored on the surface of the pigment.

Figure 1A:
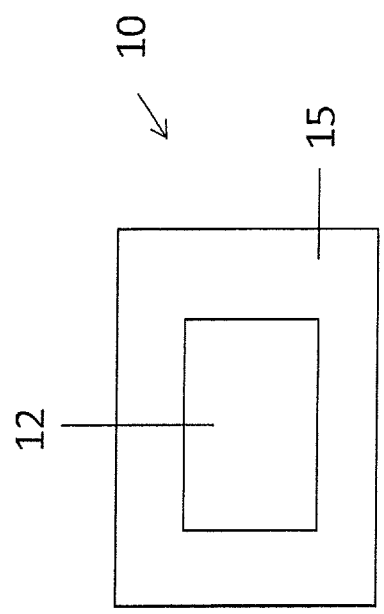
FIGS. 1A and 1B illustrate embodiments of the disclosed coated pigments.

With reference to FIG. 1A, in one embodiment, a coated pigment 10 includes a pigment 12. In one example, the pigment 12 is a metal pigment such as aluminum. In another example, the metal pigment is an alloy of aluminum and at least one selected from silicon, copper, zinc, gold-bronze, titanium, zirconium, tin, iron and steel. In one example, the pigment 12 can have a functional group that is present on the surface of the pigment 12. In one instance, the functional group can be a hydroxyl group.

In another example, the pigment 12 may be coated with a metal oxide layer. The metal oxide layer can include oxides of aluminum, silicon, titanium, zirconium, copper, zinc, tin, iron, molybdenum, manganese, or other metals, or a mixture of these metal oxides. In another instance, the metal oxide layer can include an organic-inorganic hybrid layer comprising any of these metal oxides, or a mixture of these metal oxides, crosslinked through organic linkers. In this instance, a functional group can be present on the surface of the metal oxide layer. Here, the functional group can be a hydroxyl group.

The pigment 12 can have various shapes, including, but not limited to, rod-shaped, spherical, flake-shaped, and platelet-shaped. In one implementation, the pigment utilized is an aluminum flake. The aluminum flake used can be, but is not limited to, conventional ball milled flake and vacuum metallized flake (VMF).

In one example, the pigment 12 can have a smallest dimension in a range from 5 nm to 10 µm, alternately from 20 nm to 5 µm, alternately, 50 nm to 2 µm, and a largest dimension in a range from 5 nm to 1000 µm, alternately 100 nm to 100 µm, alternately 1 µm to 50 µm. The dimensions can be measured using Field Emission Scanning Electron Microscopy (FESEM).

In one example, the surface of the pigment 12 can be treated with a phosphonate compound so that the phosphonate compound attaches to the surface of the pigment 12. In one example, the phosphonate compound attaches to the surface of the pigment 12. The terms "phosphonate" and "phosphonate compound" means any phosphonate mono- or di-ester, any phosphonic acid, or any salt arising from full or partial neutralization of a phosphonic acid by a base compound. Examples of the base compound can include ammonia; primary amines (for example allyl amine, benzyl amine, n-butyl amine, t-butyl amine, ethanol amine, ethylenediamine, etc.); secondary amines (for example dimethyl amine, di-n-propyl amine, di-isopropyl amine, t-butylcyclohexyl amine, etc.), tertiary amines (for example trimethyl amine, dimethylethyl amine, dimethyl-iso-butyl amine, dimethyl-sec-butyl amine etc.); and alkali or alkaline earth metals.

A phosphonate compound that is suitable for attaching to the surface of the pigment 12 has the following general formula (A):

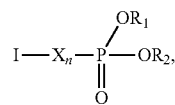

(A)

where each of $R_1$ and $R_2$ can be selected from hydrogen, optionally substituted alkyl, optionally substituted cycloalkyl, optionally substituted aryl, optionally substituted alkenyl, optionally substituted amine, polyether, an ammonium ion, an alkali metal and an alkaline earth metal, and R1=R2 or R1≠R2. In one example, at least one of R1 and R2 functions to attach the phosphonate compound to the surface of the pigment. In this instance, at least one of R1 and R2 is hydrogen or an ammonium, amino, alkali metal, or alkaline earth metal ion. X can be selected from (a) a straight or branched hydrocarbon chain, the hydrocarbon chain optionally including a heteroatom selected from O, S and N in the primary chain and optionally being partially or wholly saturated or unsaturated, (b) an optionally substituted carbocyclic ring, where the carbocyclic ring is selected from cycloalkyl, cycloalkenyl, aryl and fused carbocyclic group and (c) an optionally substituted heterocyclic ring, where the heterocyclic ring includes one or more heteroatoms selected from O, S and N. n can represent the number of carbon atoms and heteroatoms contained in X and can be an integer from 1 to 100, alternatively 5 to 50, alternatively 8 to 20. "I" can be an initiator moiety for polymerization. The term "initiator moiety" herein means a functional group that is capable of forming an initiator site for a polymerization reaction in the presence of polymerizable monomers and/or macromonomers. The initiator moiety can form a free radical on the phosphonate compound, thereby forming an initiator site on the compound. In one example, the initiator moiety can be a halogen atom or N-oxyl group or dithiocarbonyl group.

"Alkyl" can include a branched or unbranched alkyl of a carbon number of 1 to 50, alternately 1 to 20, and preferably a carbon number of 1 to 6. Examples can include methyl, ethyl, n-propyl, iso-propyl, as well as n-butyl, iso-butyl, sec-butyl, and tert-butyl, and similarly n, iso, sec and tert-pentyl, -hexyl, -octyl, -nonyl, -decyl, -undecyl, -dodecyl, -tetradecyl, -hexadecyl, -octadecyl etc.

"Cycloalkyl" can include a carbocyclic group of a carbon number of 3 to 10, preferably a carbon number of 3 to 8, further preferably a carbon number of 4 to 8. Examples can include cyclopropyl, cyclobutyl, cyclopentyl, cyclohexyl, cycloheptyl, cyclooctyl, cyclononyl, and cyclodecyl.

"Aryl" can include an optionally substituted aromatic or an optionally substituted heteroaromatic compound having a carbon number of 4 to 20, alternatively 4 to 10 and preferably 4 to 6. Examples of "aryl" can include phenyl, biphenyl, thienyl, furyl, etc. The substituents of the "optionally substituted aromatic or an optionally substituted heteroaromatic compound" can include alkyl groups such as methyl, ethyl, etc. Halogen substituents may include fluorine, chlorine, bromine, etc.

"Alkenyl" can include a straight or branched alkenyl of a carbon number of 2 to 15, preferably a carbon number of 2 to 10, further preferably a carbon number of 2 to 6 and more further preferably a carbon number of 2 to 4 having one or more double bonds at an arbitrary position. Examples can include vinyl, allyl, propenyl, etc.

"Amine" can include methylamine, ethylamine, n-propylamine, isopropylamine, etc.

"Polyethers" can include branched or unbranched polymers of ether having a carbon number of 2 to 20, alternately 2 to 15, and preferably a carbon number of 2 to 8 in the primary chain. Examples can include ethylene glycol, propylene glycol, trimethylene glycol etc.

"Alkali metal" can include lithium, sodium, potassium, etc.

"Alkaline earth metal" can include magnesium, calcium, strontium, etc.

"Cycloalkenyl" can include cycloalkenyl having one or more double bonds at an arbitrary position in a ring of the cycloalkyl. Examples can include cyclopropenyl, cyclobutenyl, cyclopentenyl, cyclohexenyl, cycloheptynyl, cyclooctynyl, and cyclohexadienyl.

"Fused carbocyclic" can include compounds with two or more rings selected from cycloalkyl, cycloalkenyl and aryl. Examples can include indanyl, indenyl, tetrahydronaphthyl, and fluorenyl.

"Heterocyclic" can include a compound having a ring with one or more heteroatoms arbitrarily selected from O, S, and N in the ring. Examples can include a 5- to 6-membered heteroaryl.

The substituent for the "optionally substituted alkyl", "optionally substituted cycloalkyl", "optionally substituted aryl", "optionally substituted alkenyl, "optionally substituted amine", "optionally substituted carbocyclic ring", and "optionally substituted heterocyclic ring" can include alkyl, hydroxyl, amino, thio, ether, or ester groups.

"$X_n$" can have a function of providing passivation properties to the coated pigment. In one example, the component(s) of "X" and the value of "n" are selected such that "$X_n$" is relatively hydrophobic and relatively compact. In this instance, "$X_n$" allows dense intermolecular packing so that a barrier for preventing water and other corrosive species from reaching the pigment surface can be formed around the pigment.

One embodiment of the phosphonate compound having the formula (A) is a phosphonate compound having the following formula (I):

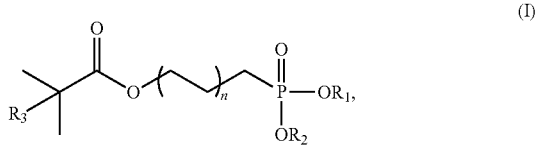

(I)

where $R_3$ can be an initiator moiety, each of $R_1$ and $R_2$ can be selected from hydrogen, alkyl, cycloalkyl, aryl, alkenyl, amine, polyether, an ammonium ion, an alkali metal and an alkaline earth metal, and R1=R2 or R1≠R2. In one example, at least one of R1 and R2 functions to attach the phosphonate compound to the pigment surface. In this instance, at least one of R1 and R2 is hydrogen or an ammonium, amino, alkali metal, or alkaline earth metal ion. n can be 1 to 100. The term "initiator moiety" herein means a functional group that is capable of forming an initiator site for a polymerization reaction in the presence of polymerizable monomers and/or macromonomers. The initiator moiety can form a free radical on the phosphonate compound, thereby forming an initiator site on the compound. In one example, the initiator moiety can be a halogen atom or N-oxyl group or dithiocarbonyl group. In one instance, n can be a positive integer. In another instance, n can be between 5 and 50, alternatively between 8 and 18. In one exemplary embodiment, n is 5.

An example of the phosphonate compound that can be used is 11-(2-bromoisobutyrate)-undecyl-1-phosphonic acid.

With reference to FIG. 1A, a coated pigment 10 is obtained by attaching a phosphonate compound having the general formula (A) to the surface of the pigment 12, forming an organic layer 15 containing an initiator sites for polymerization. By way of example, a phosphonate compound having the general formula (I) attaching to the surface of the pigment 12 will be described.

In one implementation, a phosphonate compound having the general formula (I) can attach to the surface of the pigment 12 by hydrogen bonding. A schematic representation of the general mechanism of the phosphonate compound having the general formula (I) attaching on the surface of the pigment 12 is shown in FIG. 2.

Figure 2:
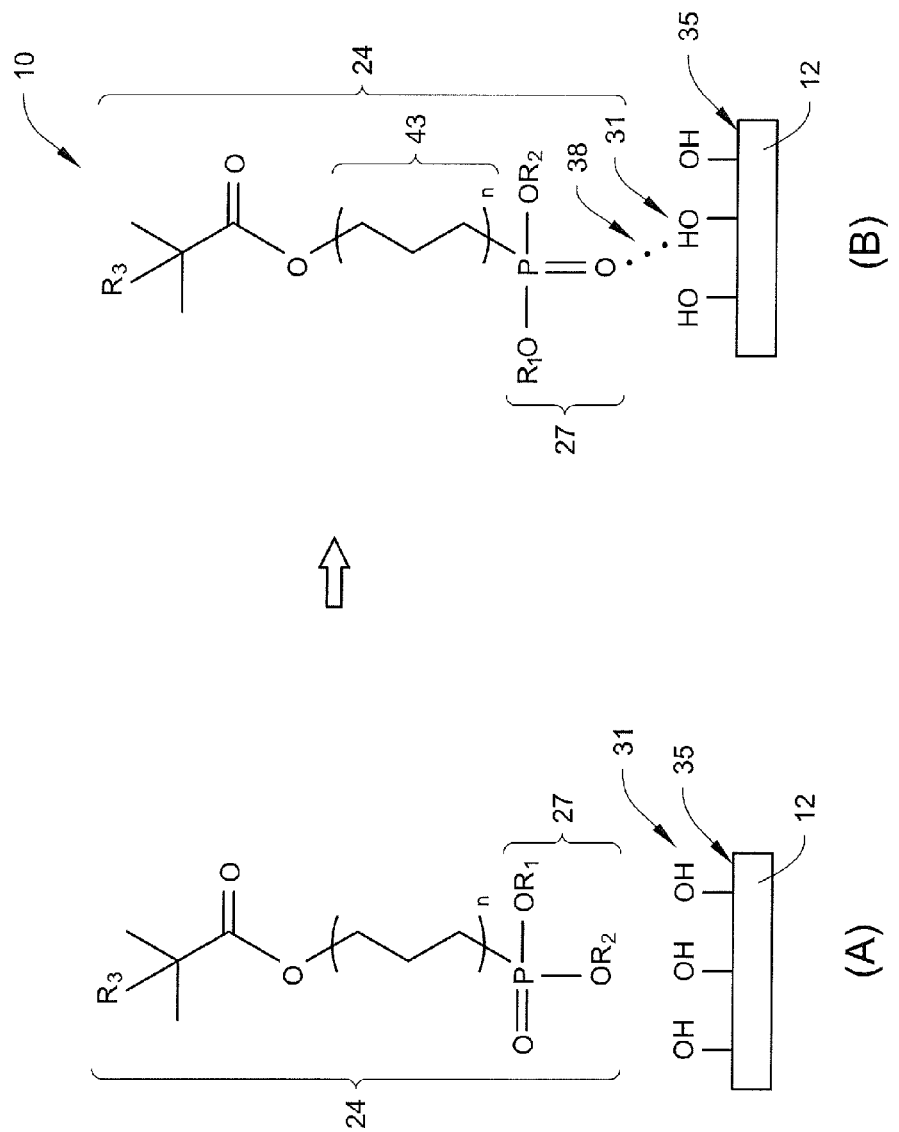
FIG. 2 illustrates a schematic representation of one example of the disclosed process.

With reference to FIG. 2, a phosphonate compound 24 used to form the organic layer 15 is shown in (A) of FIG. 2. The phosphonate compound 24 with a general formula (I) has a phosphonate functional group 27. With reference to (B) of FIG. 2, the phosphonate functional group 27 interacts with hydroxyl group 31 that is present on the surface 35 of the pigment 12 via hydrogen bonding 38 between the oxygen of the "P=O" and hydrogen of the hydroxyl group 31. The hydrogen bonding can contribute to providing passivation of the coated pigment 10.

In another implementation, the surface of the pigment 12 is modified by reacting the pigment 12 with a phosphonate compound having the general formula (I). In one instance, in the general formula (I), each of $R_1$ and $R_2$ is hydrogen, alkyl or aryl. A schematic representation of an exemplary reaction between a functional group on the surface of the pigment 12 and the hydrolysable phosphonate compound having the general formula (I) is shown in FIG. 3.

Figure 3:
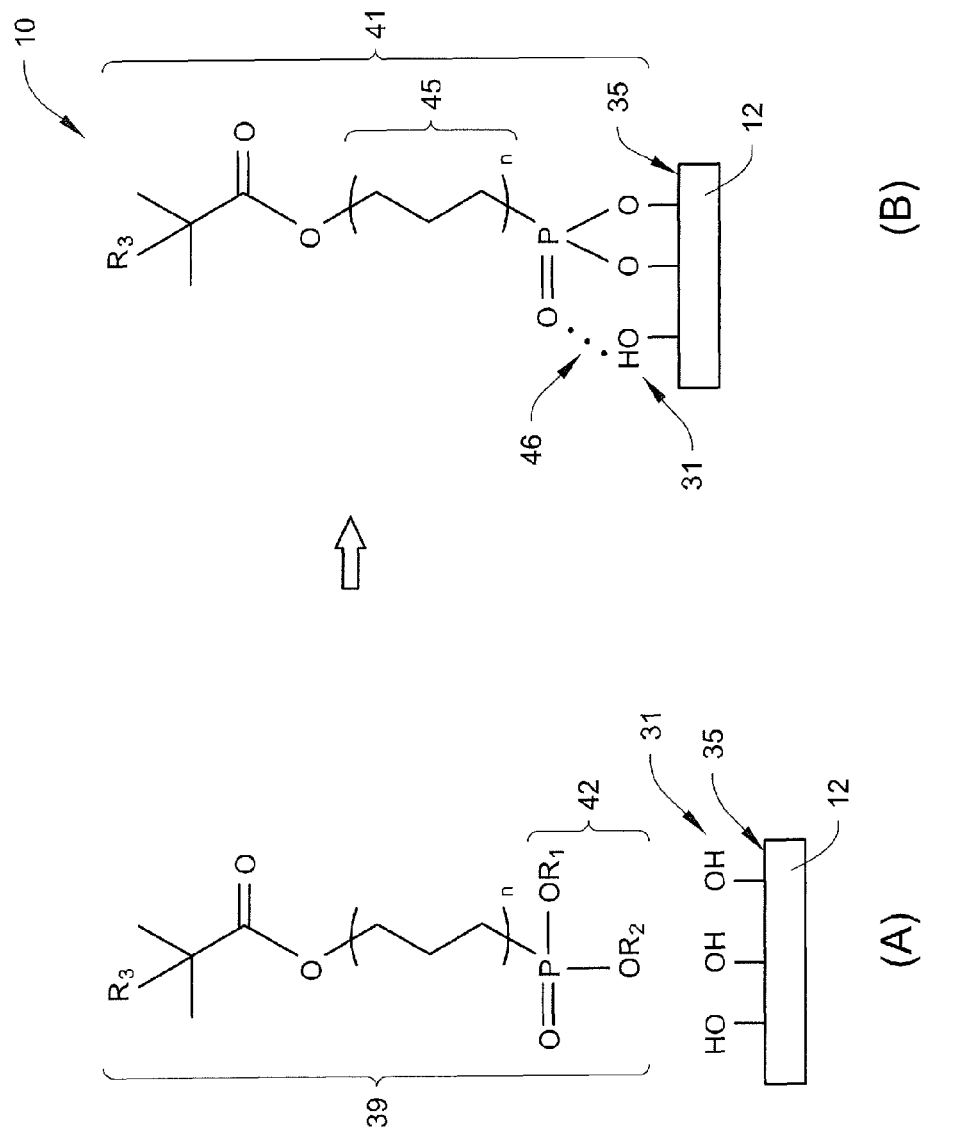
FIG. 3 illustrates a schematic representation of another example of the disclosed process.

With reference to FIG. 3, a phosphonate compound 39 used to form the organic layer 15 is shown in (A) of FIG. 3. The phosphonate compound 39 with the general formula (I) has a phosphonate functional group 42. The phosphonate functional group 42 reacts with a hydroxyl group 31 that is present on the surface 35 of the pigment 12 via a hydrolysis and condensation reaction so as to form the coated pigment 10 having pigment-O—P bonds as shown in (B) of FIG. 3. Hydrogen bonding 46 also is present between the oxygen of the "P=O" and hydrogen of the hydroxyl group 31. The pigment-O—P bonds and the hydrogen bonding can contribute to providing passivation to the coated pigment 10.

The coated pigment 10 can include a phosphonate moiety 41 or the phosphonate compound 24, where the phosphonate compound 24 includes an alkane chain 43 and the phosphonate moiety 41 includes an alkane chain 45. The alkane chains 43 and 45 can provide additional passivation to the coated pigment 10.

In some examples, the thickness of the organic layer 15 can be in a range of 1 nm-200 nm. Further, the size of the coated pigment 10 can be any size that is suitable for forming an effect pigment. In one implementation, the coated pigment 10 can have a smallest dimension in a range from 5 nm to 10 μm, alternately from 20 nm to 5 μm, alternately, 50 nm to 2 μm, and a largest dimension in a range from 5 nm to 1000 μm, alternately 100 nm to 100 μm, alternately 1 μm to 50 μm. The dimensions can be measured using Field Emission Scanning Electron Microscopy (FESEM).

Figure 6B:
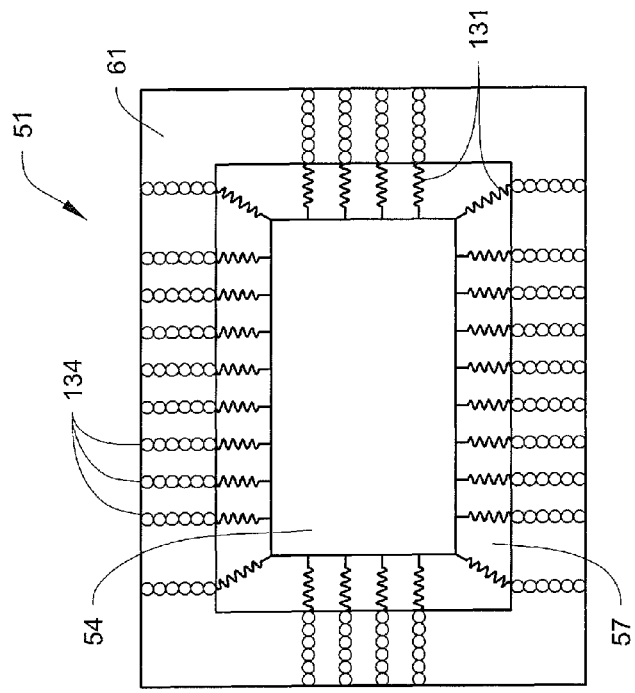
FIGS. 6A and 6B illustrate a schematic representation of the contents of the coated pigments shown in FIGS. 1A and 1B, respectively.
Figure 6A:
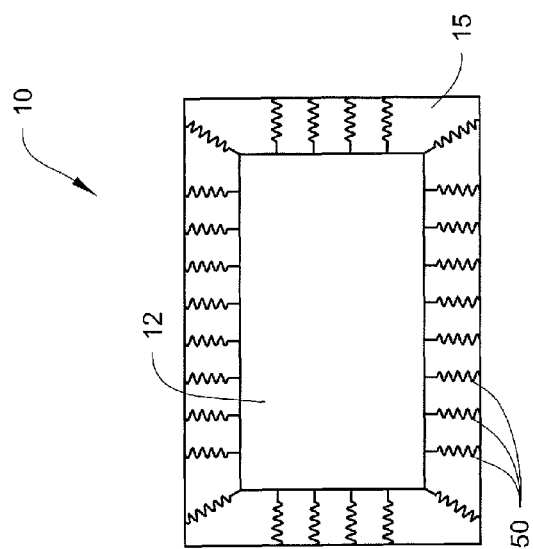

It is to be understood that FIGS. 2 and 3 are schematic representations of one compound attaching to or reacting with the surface of the pigment 12, and that the organic layer 15 is formed by a plurality of phosphonate compounds or phosphonate moieties 50 surrounding the pigment 12 as shown in FIG. 6A. The phosphonate compounds or phosphonate moieties 50 can cover the pigment 12 partially or wholly. Also, FIGS. 2, 3 and 6A show the phosphonate compounds and phosphonic moieties being oriented perpendicular to the surface of the pigment, but the orientation of the phosphonate compounds and the phosphonic moieties is not particularly limited.

Further, in the instances illustrated in FIGS. 2, 3 and 6A, the organic layer 15 includes a monolayer including the plurality of phosphonate compounds or phosphonate moieties and having a thickness of one heteroorganic compound. However, in some other instances, the organic layer 15 can include multiple monolayers.

Figure 1B:
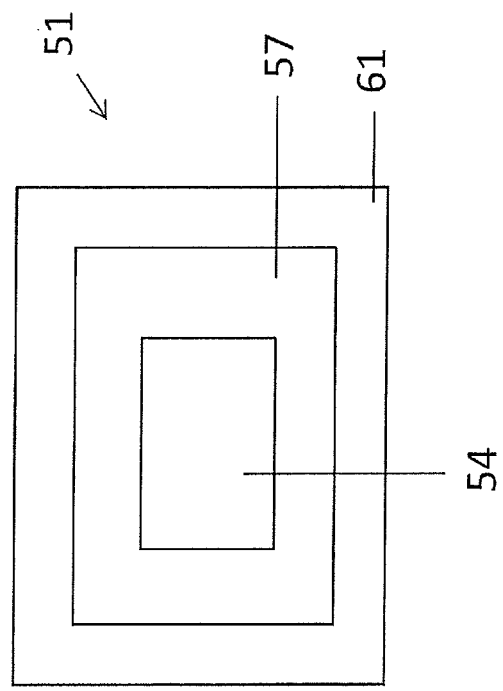

With reference to FIG. 1B, in another embodiment, in general, a coated pigment 51 is obtained by attaching an initiator moiety onto the surface of a pigment 54 so as to form an organic layer 57 containing initiator sites for polymerization and then forming a polymer layer 61 from the initiator sites via polymerization.

The pigment 54 included in the coated pigment 51 in this embodiment is a metal pigment such as aluminum. In another example, the metal pigment is an alloy of aluminum and at least one selected from silica, copper, zinc, gold-bronze, titanium, zirconium, tin, iron and steel. In one exemplary embodiment, the metal pigment is aluminum. In one example, the pigment 54 can have a functional group that is present on the surface of the pigment 54. In one instance, the functional group can be a hydroxyl group.

In another example, the pigment 54 may be coated with a metal oxide layer. The metal oxide layer can include oxides of aluminum, silicon, titanium, zirconium, copper, zinc, tin, iron, molybdenum, manganese, or other metals, or a mixture of these metal oxides. In another instance, the metal oxide layer can include an organic-inorganic hybrid layer comprising aluminum, silicon, titanium, zirconium, copper, zinc, tin, iron, molybdenum, manganese, or other metals or metal oxides of these metals, or a mixture of these metal oxides, crosslinked through organic linkers. In this instance, a functional group can be present on the surface of the metal oxide layer. Here, the functional group can be a hydroxyl group.

The pigment 54 can have various shapes, including, but not limited to, rod-shaped, spherical, flake-shaped, and platelet-shaped. In one implementation, the pigment utilized is an aluminum flake. The aluminum flake used can be, but is not limited to, conventional ball milled flake and vacuum metallized flake (VMF).

In one example, the pigment 54 has a smallest dimension in a range from 5 nm to 10 µm, alternately from 20 nm to 5 µm, alternately, 50 nm to 2 µm, and a largest dimension in a range from 5 nm to 1000 µm, alternately 100 nm to 100 µm, alternately 1 µm to 50 µm. Where the pigment 54 is a sphere, the pigment 54 has a diameter of up to 1000 µm.

In one example, the pigment 54 can be coated with an organic layer 57 that includes the phosphonate compound having the general formula (I), where $R_1$, $R_2$ and $R_3$ are as described above. In one instance, each of $R_1$ and $R_2$ is hydrogen in the general formula (I)

Figure 4:
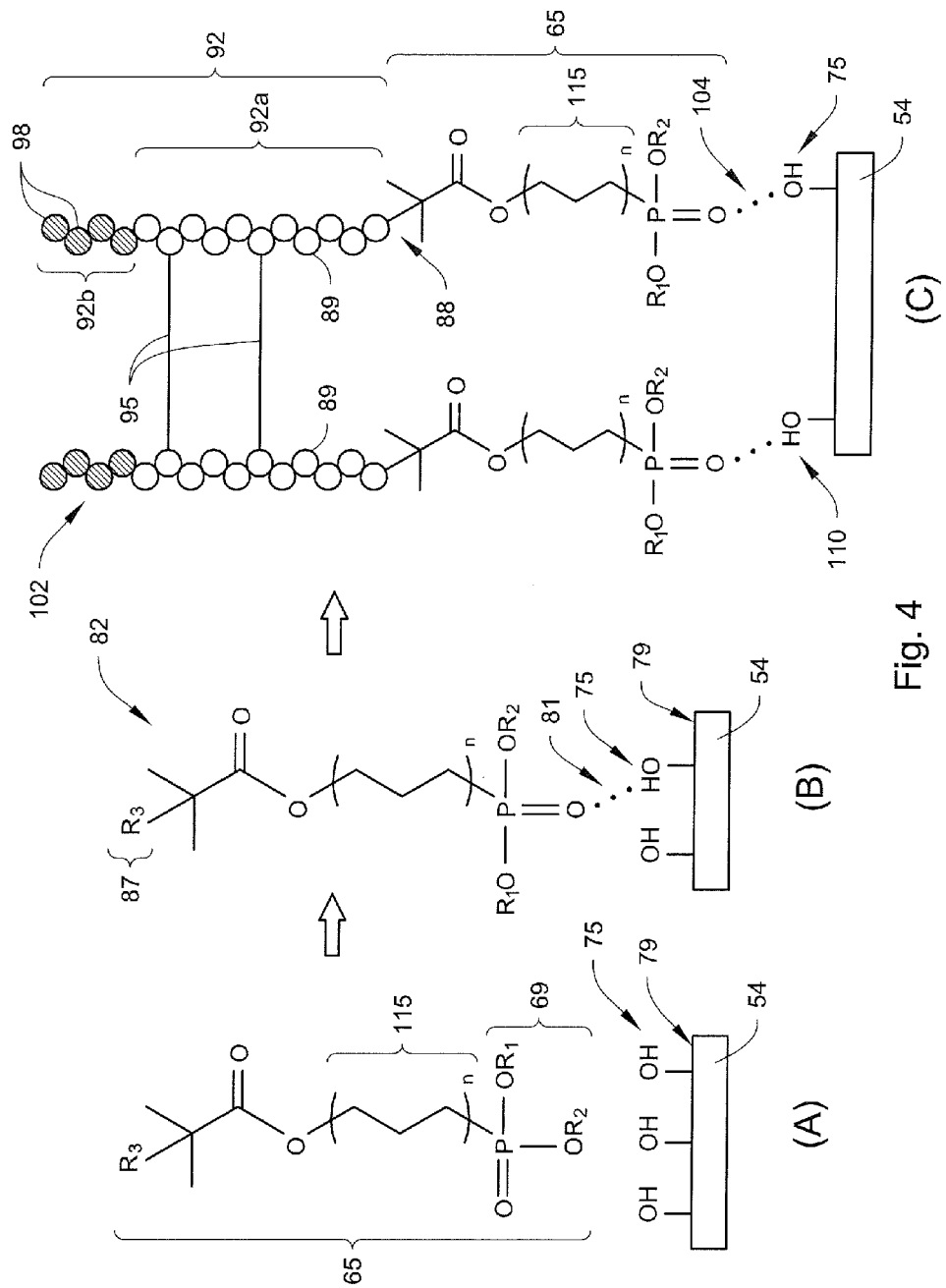
FIG. 4 illustrates a schematic representation of yet another example of the disclosed process.
Figure 4:
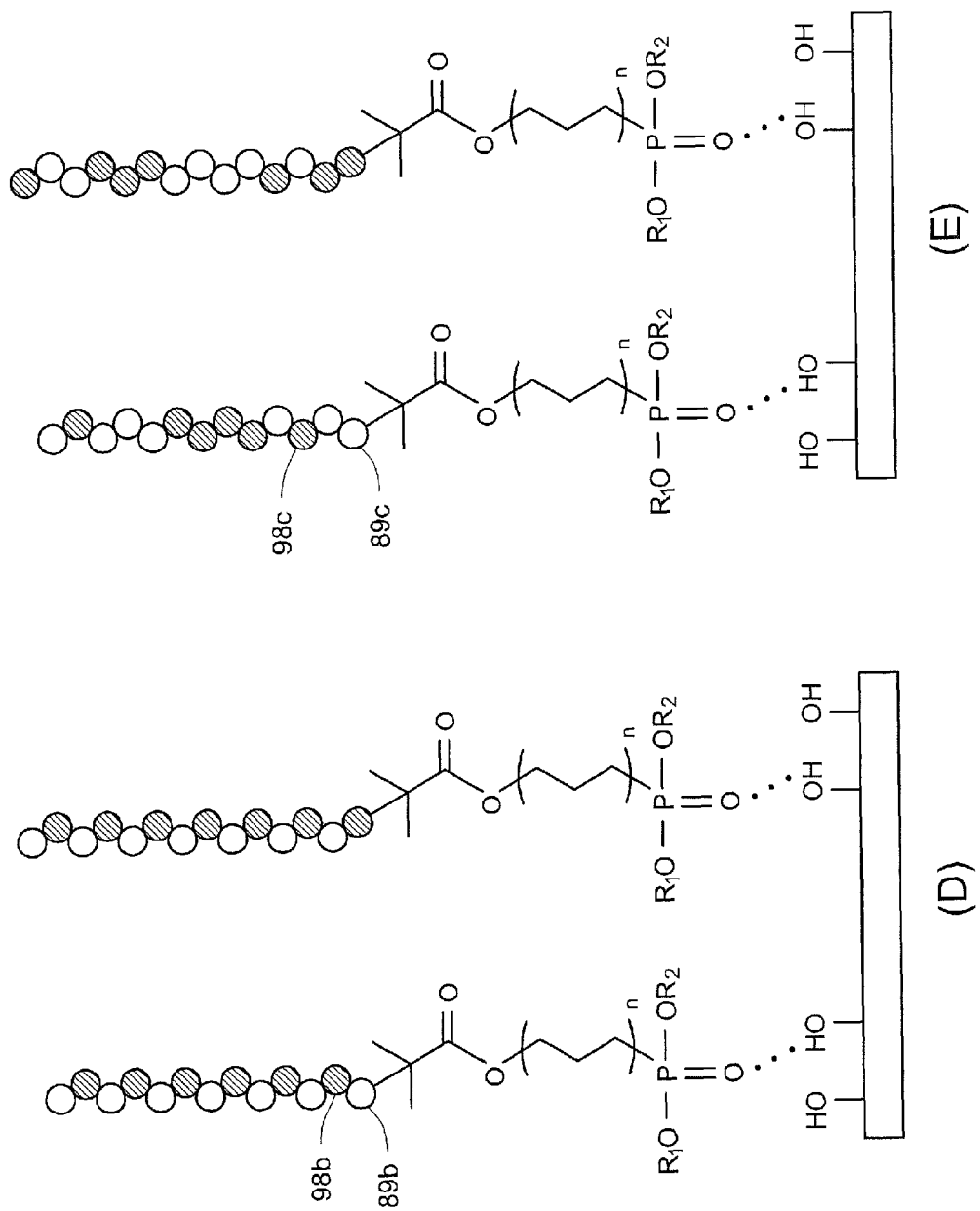

With reference to (A) of FIG. 4, the initiator compound 65 reacts with the general formula (I) has a phosphonate functional group 69. The initiator compound 65 interacts with a hydroxyl group 75 that is present on the surface 79 of the pigment 54 via hydrogen bonding 81 between the oxygen of the "P=O" and the hydrogen of the hydroxyl group 75 so as to form a treated pigment 82. The treated pigment 82 includes the initiator compound 65 that is hydrogen bonded to the pigment 54 as shown in (B) of FIG. 4. The initiator compound 65 includes an initiator moiety 87, which is represented as $R_3$. The initiator moiety 87 is a functional group that is capable of forming an initiator site for free radical polymerization, controlled radical polymerization and/or other chain polymerization. In one exemplary embodiment, the initiator moiety 87 is a halogen atom or an N-oxyl group or dithiocarbonyl group.

With reference to FIG. 1B, the organic layer 57 is coated with a polymer coating 61. The polymer coating 61 includes polymer chains. The polymer chains are an assembly of monomers that are formed by a polymerization reaction. In one example, the polymer coating 61 includes a plurality of layers, where the monomers of the polymer chains in each of the layers may be the same or different.

With reference to (C) of FIG. 4, monomers 89 are reacted at an initiator site 88 on the initiator compound 65 formed by the initiator moiety 87 to create a polymer chain 92. The polymer chain 92 is formed after the phosphonate compound 65 attaches on the surface 79 of the pigment 54. In the example shown in FIG. 4, the polymer chain 92 includes a polymer chain 92a and a polymer chain 92b. The polymer chain 92a includes the monomers 89 and the polymer chain 92b includes monomers 98. In one instance, the polymer chain 92a is included in one layer of the polymer coating 61 and the polymer chain 92b is included in another layer of the polymer coating 61. In one example, the monomers 89 and the monomers 98 are different.

In another example the polymer coating 61 is composed of monomers 89b and monomers 98b which reacts alternatively to form alternate copolymer structure as shown in (D) of FIG. 4.

In another example the polymer coating 61 is composed of monomers 89c and 98c which reacts randomly to form random copolymer structure as shown in (E) of FIG. 4.

In another example the polymer coating 61 is composed of more than 1 monomer.

In another instance, referring Figure (C) of FIG. 4, the polymer coating 61 includes inter-chain cross-links 95. In one example, the inter-chain cross-links 95 link the polymer chain 92 with another polymer chain 102.

In another example the inter chain cross-links is not limited to two chains. That is, the cross linking can be between more than two polymer chains to form a highly dense crosslinked polymer layer 61.

In another example, the pigment 54 can be coated with an organic layer 57 that includes a surface treatment material. In one example, the surface treatment material is an initiator material that includes a phosphonate moiety formed by a reaction between an initiator compound and a functional group on the surface of the pigment 54. In this instance, the initiator compound is a phosphonate compound, and reaction produced of the phosphonate compound and the functional group on the surface of the pigment is the initiator material.

A phosphonate compound that can be used as an initiator compound is the phosphonate compound having the general formula (I), where $R_1$, $R_2$ and $R_3$ are as described above. In one instance, each of $R_1$ and $R_2$ is alkyl or aryl.

An exemplary initiator compound that can be used is 11-(2-bromoisobutyrate)-undecyl-1-phosphonic ester.

In one implementation, the initiator compound having the formula (I) is reacted with the surface of the pigment 54 to form the organic layer 57. A schematic representation of an exemplary reaction between the surface of the pigment 54 and an initiator compound 116 having the general formula (I) is shown in FIG. 5.

Figure 5:
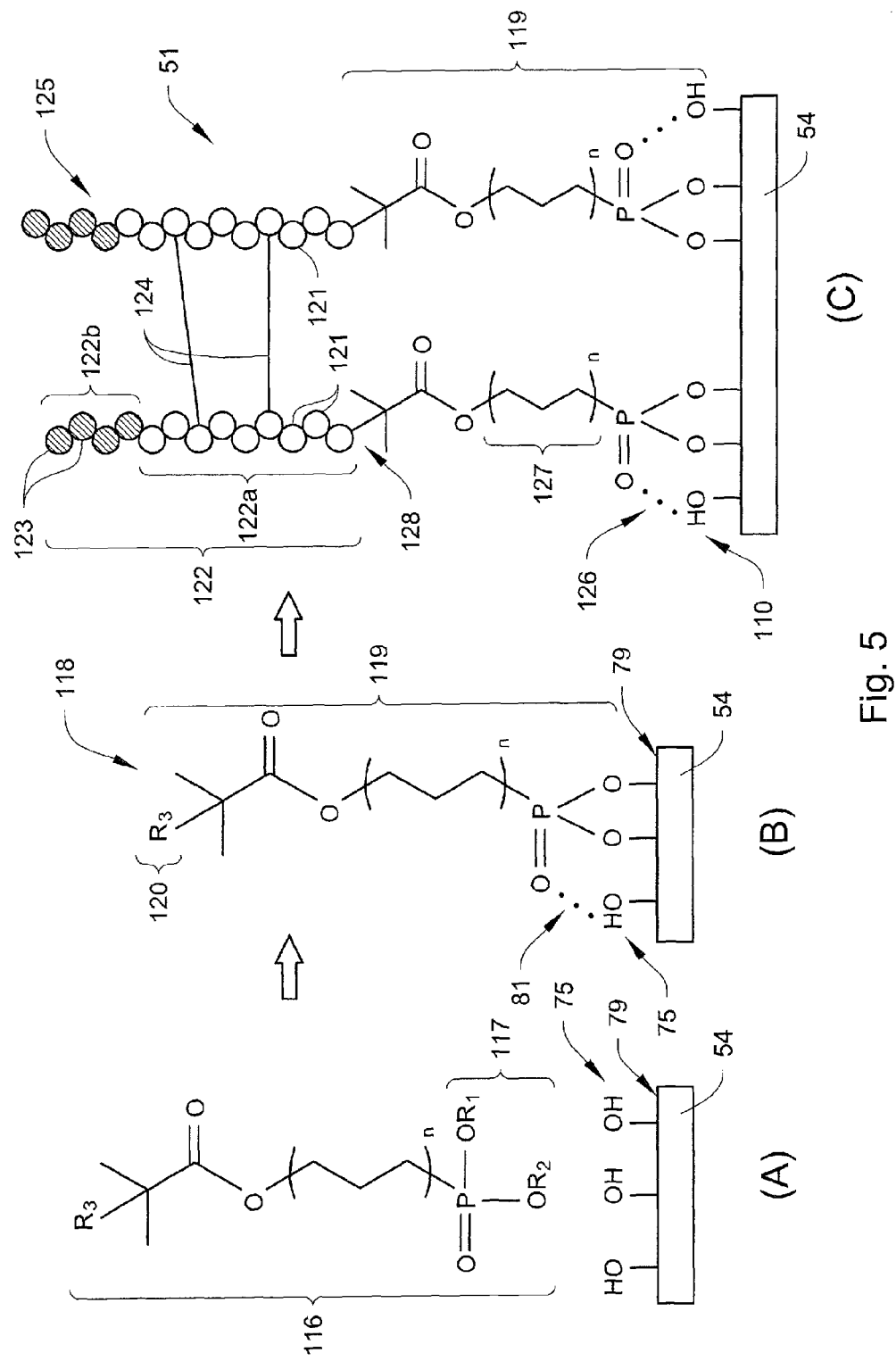
FIG. 5 illustrates a schematic representation of yet another example of the disclosed process.
Figure 5:
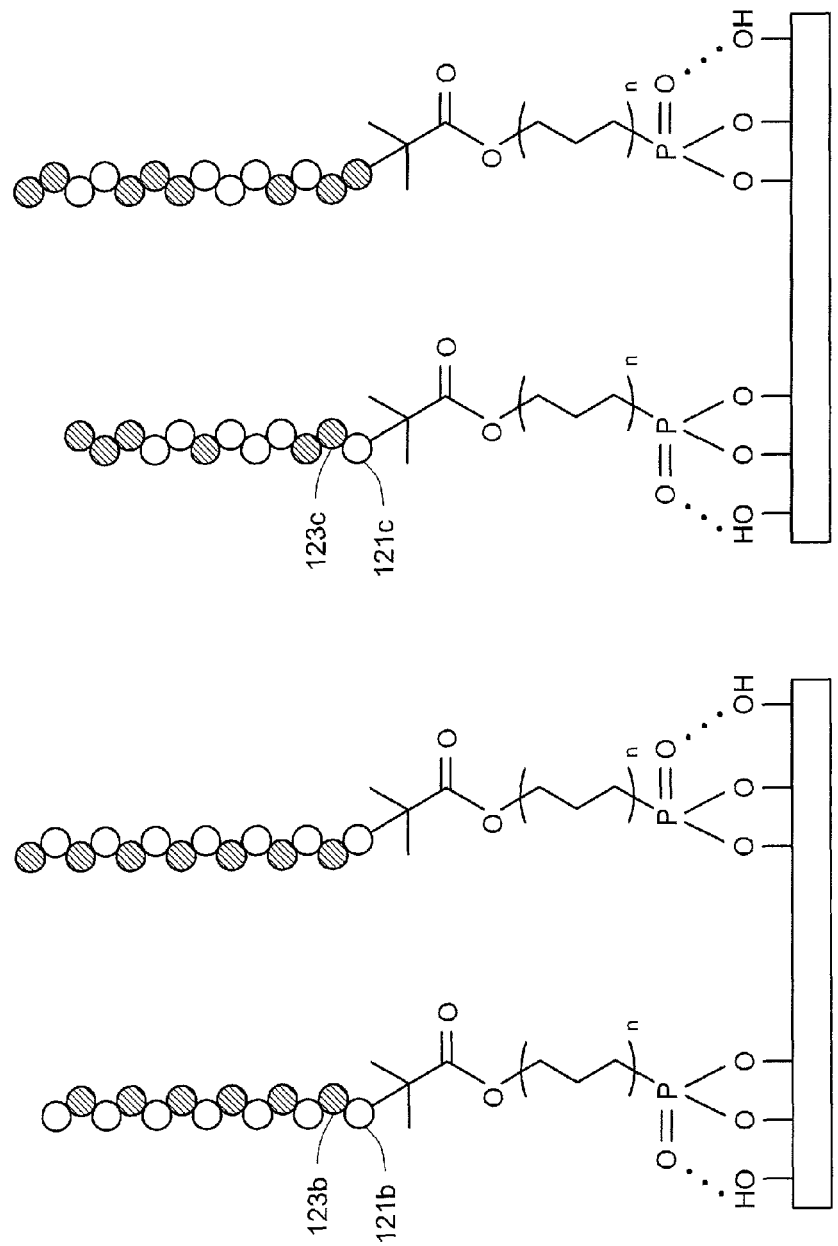

With reference to (A) of FIG. 5, the initiator compound 116 with a general formula (I) has a phosphonate functional group 117. The phosphonate functional group 117 reacts with a hydroxyl group 75 that is present on the surface 79 of the pigment 54 via a hydrolysis and condensation reaction so as to form a treated pigment 118. The treated pigment 118 includes a phosphonate moiety 119 that is covalently bonded to the pigment 54 as shown in (B) of FIG. 5. The phosphonate moiety 119 includes an initiator moiety 120, which is represented as $R_3$. The initiator moiety 120 is a functional group that is capable of forming an initiator site for controlled radical polymerization and/or other chain polymerization. In one exemplary embodiment, the initiator moiety 120 is a halogen atom or an N-oxyl group or a dithiocarbonyl group.

With reference to FIG. 1B, the organic layer 57 is coated with a polymer coating 61. The polymer coating 61 includes polymer chains. The polymer chains are an assembly of monomers that are formed by a polymerization reaction. In one example, the polymer coating 61 includes a plurality of layers, where the monomers of the polymer chains in each of the layers may be the same or different.

With reference to (C) of FIG. 5, monomers 121 are reacted at an initiator site 128 formed on the phosphonate moiety 119 by the initiator moiety 120 to create a polymer chain 122. The polymer chain 122 is formed after the phosphonate moiety 119 is formed on the surface 79 of the pigment 54. In the example shown in FIG. 5, the polymer chain 122 includes a polymer chain 122a and a polymer chain 122b. The polymer chain 122a includes the monomers 121 and the polymer chain 122b includes monomers 123. In one instance, the polymer chain 122a is included in one layer of the polymer coating 61 and the polymer chain 122b is included in another layer of the polymer coating 61. In one example, the monomers 121 and the monomers 123 are different.

In another example the polymer coating 61 is composed of monomers 121b and monomers 123b which reacts alternatively to form alternate copolymer structure as shown in (D) of FIG. 5.

In another example the polymer coating 61 is composed of monomers 121c and 123c which reacts randomly to form random copolymer structure as shown in (E) of FIG. 5.

In another example the polymer coating 61 is composed of more than 1 monomer.

In another instance, the polymer coating 61 includes inter-chain cross-links 124. In one example, the inter-chain cross-links 124 link the polymer chain 122 with another polymer chain 125.

In another example the inter chain cross-links is not limited to two chains. That is, the cross linking can be between more than two polymer chains to form a highly dense crosslinked layer of 61.

Examples of monomers that can be included in the polymer chains 92 and 122 include, but are not limited to, acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, perfluorocyclohexylmethyl methacrylate methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly(ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6-hexanediol diacrylate, 1,6-hexanediol dimethacrylate, 1,9-nonanediol dimethacrylate, 2,2-bis(4-methacryloxyphenyl)propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N,N' ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol)diacrylate, and poly(ethylene glycol)dimethacrylate.

The polymer coating 61 can provide an additional barrier function to the pigment 54. In one implementation, the polymer coating 61 includes an inner passivation layer and an outer dispersion layer. For coated pigments designed for waterborne systems, a hydrophobic inner layer may provide a barrier to prevent water from reaching the aluminum flakes. At the same time, a hydrophilic outer layer will allow the coated pigments to be dispersed into aqueous media. In one example, the inner passivation layer includes a hydrophobic polymer and the outer dispersion layer includes a hydrophilic polymer. Examples of hydrophobic polymers that can be used include polystyrene, poly(methyl acrylate), poly(methyl methacrylate), poly(n-butyl acrylate), poly(n-butyl methacrylate), poly(t-butyl acrylate), poly(t-butyl methacrylate), poly(2-ethylhexyl acrylate), poly(2-ethylhexyl methacrylate), poly(n-octyl acrylate), poly(n-octyl methacrylate), poly(iso-octyl acrylate), poly(iso-octyl methacrylate), and poly(perfluorocyclohexylmethyl methacrylate). Examples of the hydrophilic polymers that can be used include poly(2-hydroxyethyl acrylate), poly(2-hydroxyethyl methacrylate), poly(dimethylaminoethyl acrylate), poly(dimethylaminoethyl methacrylate), poly(acrylic acid), poly(methacrylic acid), poly(glycidyl methacrylate), poly(glycidyl acrylate), poly(N-iso-propylacrylamide), poly(oligo(ethylene glycol) acrylate), poly(oligo(ethylene glycol) methacrylate).

In one example, the coated pigment 51 can have hydrogen bonding 104 between the pigment and the hydroxyl group 75 on the surface of the pigment 54 as shown in (C) of FIG. 4. In another example, the coated pigment 51 can have pigment-O—P bonds as shown in (C) of FIG. 5. Hydrogen bonding 126 also can be present between the oxygen of the "P=O" and hydrogen of the hydroxyl group 110. The pigment-O—P bonds and the hydrogen bonding can contribute to providing passivation to the coated pigment 51.

The phosphonate compound 65 includes an alkane chain 115. The phosphonate moiety 119 of the coated pigment 51 includes an alkane chain 127. The alkane chains 115 and 127 can provide additional passivation to the coated pigment 51.

In some examples, the thickness of the organic layer 57 can be in a range of 1 nm-200 nm. Further, the size of the coated pigment 51 can be any size that is suitable for forming an effect pigment. The thickness of the polymer layer 61 can be from a few nanometers up to hundreds of nanometers. In one implementation, the coated pigment 51 can have a smallest dimension in a range from 5 nm to 10 μm, alternately from 20 nm to 5 μm, alternately, 50 nm to 2 μm, and a largest dimension in a range from 5 nm to 1000 μm, alternately 100 nm to 100 μm, alternately 1 μm to 50 μm. The dimensions can be measured using Field Emission Scanning Electron Microscopy (FESEM).

It is to be understood that FIGS. 4 and 5 are schematic representations of one initiator compound or initiator moieties attaching to or reacting with the surface of the pigment 54, and that the organic layer 57 is formed by a plurality of initiator compounds or initiator moieties 131 surrounding the pigment 54 as shown in FIG. 6B. The initiator compounds or initiator moieties 131 can cover the pigment 54 partially or wholly. Also, a polymer layer 61 is likewise formed by a plurality of polymer chains 134 surrounding the organic layer 57. The polymer chains 134 can cover the pigment 54 partially or wholly. Further, FIGS. 4-5 and 6B show the initiator compounds and moieties and the polymer chains being oriented perpendicular to the surface of the pigment, but the orientation of the initiator compounds and moieties and the polymer chains is not particular limited.

Further, in the instances illustrated in FIGS. 4, 5 and 6A, the organic layer 57 includes a monolayer including the plurality of phosphonate compounds or phosphonate moieties and having a thickness of one heteroorganic compound. However, in some other instances, the organic layer 57 can include multiple monolayers.

In one example, the coated pigment includes the phosphonate compound in an amount sufficient to provide passivation properties to the coated pigment. The term "passivation property" herein means the capability of shielding the pigment from environmental factors such as water. The passivation property can be measured, for example, by measuring the amount of hydrogen gas that is evolved when pigments are brought into contact with an aqueous medium. In one example, the amount of the phosphonate compound is between 0.01% to 100%, preferably between 0.1% to 50%, and most preferably between 1% to 10% weight based on the weight of the pigment.

In another example, the coated pigment includes the polymer chain in an amount sufficient to provide dispersion properties to the coated pigment. The term "dispersion property" herein means the capability of separating easily the individual pigment particles and uniformly distributing the pigment particles in a liquid. The dispersion property can be measured, for example, by optical measurements of a system that includes the coated pigments within a liquid, or by measuring the colorimetry of the final dried coating. In the latter case, non-uniform distribution of the pigment particles in the liquid phase will result in poor orientation in the coating, thereby reducing the brightness at near-specular viewing angles. Thus, a lower brightness at near-specular viewing angles would be indicative of a poor dispersion property. In one example, the amount of the polymer chain is between 0.01% to 100%, preferably between 0.1% to 50%, and most preferably between 1% to 10% weight based on the weight of the pigment.

Figure 7:
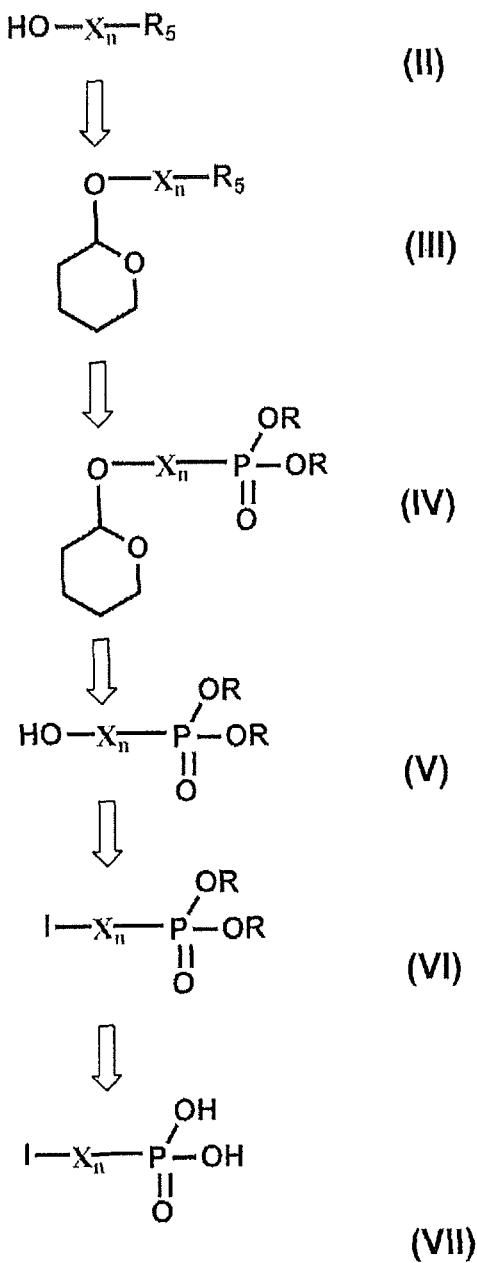
FIG. 7 illustrates a general schematic representation of embodiment of the disclosed process.

The phosphonate compound having the general formula (A) can be synthesized in the steps as illustrated in FIG. 7. In the compound with formula (II), $R_5$ can be a halogen, for example, bromine, chlorine, etc. As shown in FIG. 7, the hydroxyl group of formula (II) can be protected by treating with dihydropyran to form compound with formula (III).

$$HO-X_n-R_5 \quad (II)$$

(III)

The compound with the formula (III) can be then reacted with an organophosphorous compound. The organophosphorous compound utilized can be trialkyl phosphite, triaryl phosphite, triarylalkyl phosphite etc.

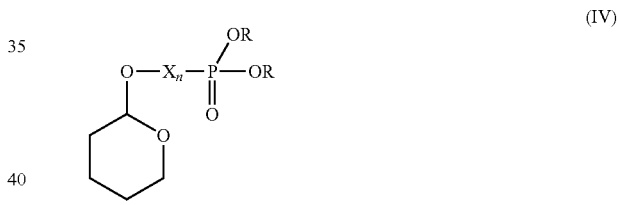

(IV)

The protected alcohol compound with formula (IV) can be deprotected to obtain compound with general formula (V).

(V)

The compound (V) can be used as the primary building block to react with any initiator of choice having a reactive group capable of reacting with the alcohol functionality of compound with (V) to obtain compound with formula (VI).

(VI)

The compound with the formula (VI) corresponds to the compound with the formula (A) where $R_1$ and $R_2$ are alkyl, aryl, etc. Dealkylation of phosphonic ester in compound (VI)

can be carried out to obtain the compound with formula (VII). The compound with formula (VII) is similar to the compound with the formula (A) where $R_1$ and $R_2$ are hydrogen.

(VII)
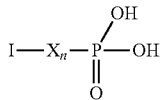

Figure 8:
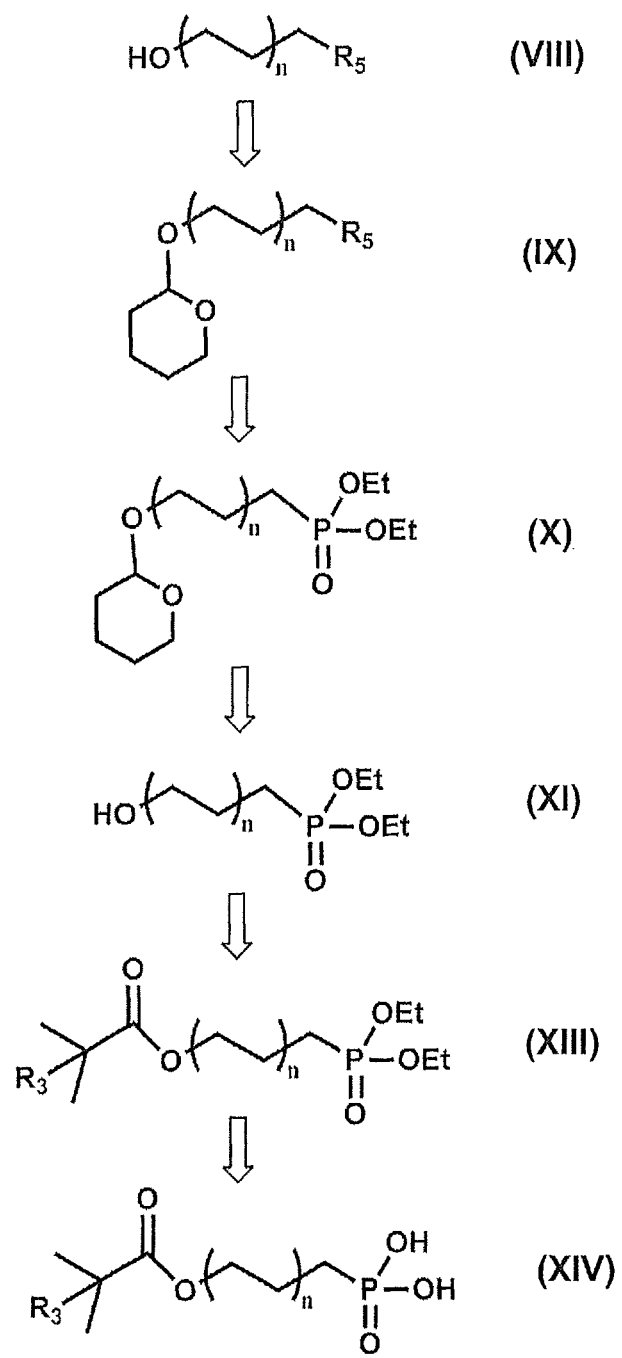
FIG. 8 illustrates a schematic representation of a specific embodiment of the disclosed process.

In one embodiment of the disclosed method, the phosphonate compound having the general formula (I) can be synthesized in the steps as illustrated in FIG. 8. In the compound with formula (VIII), $R_5$ can be a halogen, for example, bromine, chlorine, etc. As shown in FIG. 8, the hydroxyl group of formula (VIII) can be protected by treating with dihydropyran to form compound with formula (IX).

(VIII)
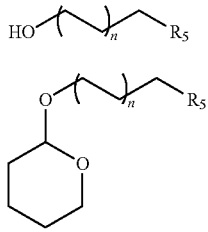

(IX)

The compound with the formula (IX) can be then reacted with an organophosphorous compound.

The organophosphorous compound utilized can be trialkyl phosphite, triaryl phosphite, triarylalkyl phosphite etc. For instance where triethyl phosphite is used, a compound with the following formula (X) can be obtained:

(X)
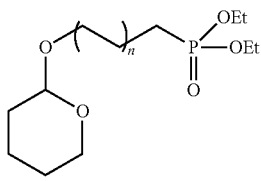

The protected alcohol compound with formula (X) can be deprotected to obtain compound with general formula (XI).

(XI)

XII
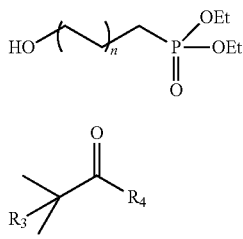

The compound with the formula (XI) can be reacted with a compound with the formula (XII), where $R_3$ and $R_4$ are halogens, for example bromine, chlorine, etc to form a compound with the following formula (XIII).

(XIII)
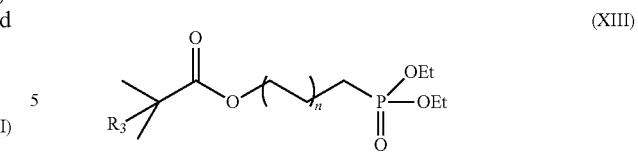

The compound with the formula (XIII) corresponds to the compound with the formula (I) where $R_1$ and $R_2$ are ethyl. Dealkylation of phosphonic ester in compound (XIII) can be carried out to obtain the compound with formula (XIV). The compound with formula (XIV) is similar to the compound with the formula (I) where $R_1$ and $R_2$ are hydrogen.

(XIV)
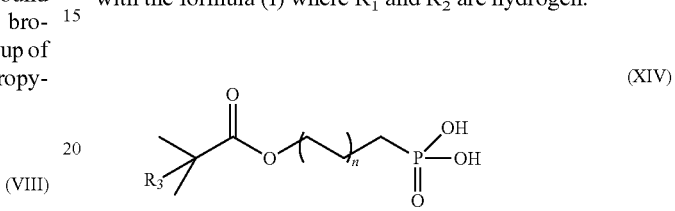

Figure 9:
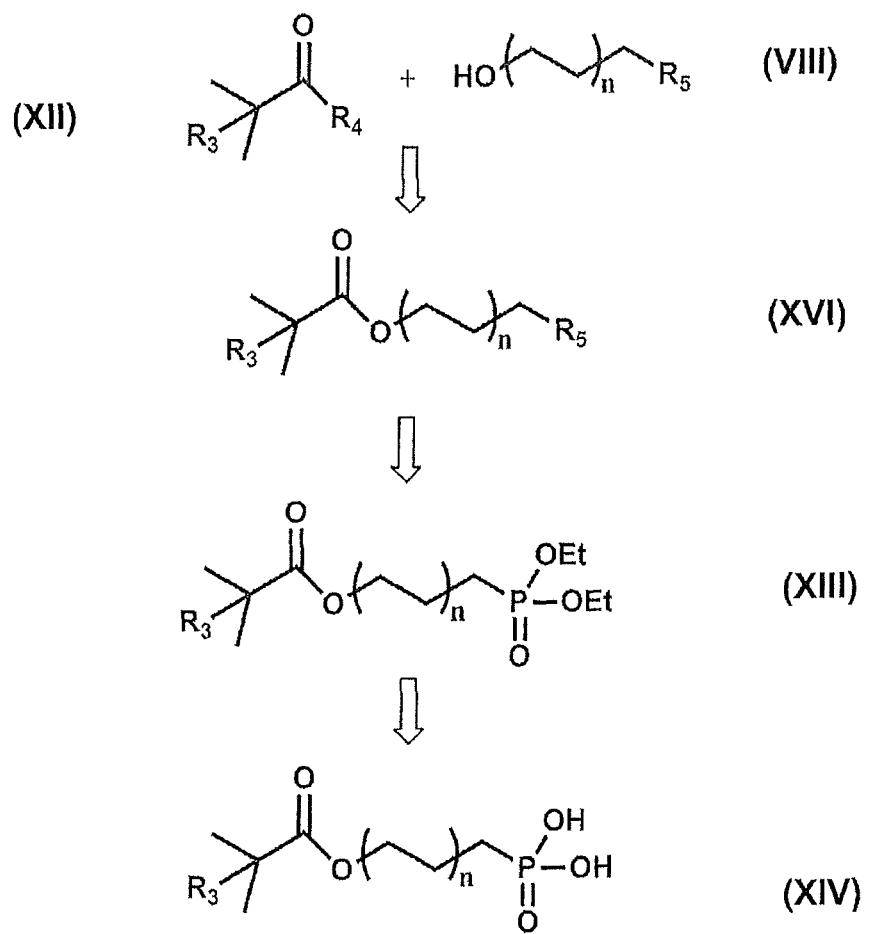
FIG. 9 illustrates another schematic representation of another specific embodiment of the disclosed process.
Figure 10:
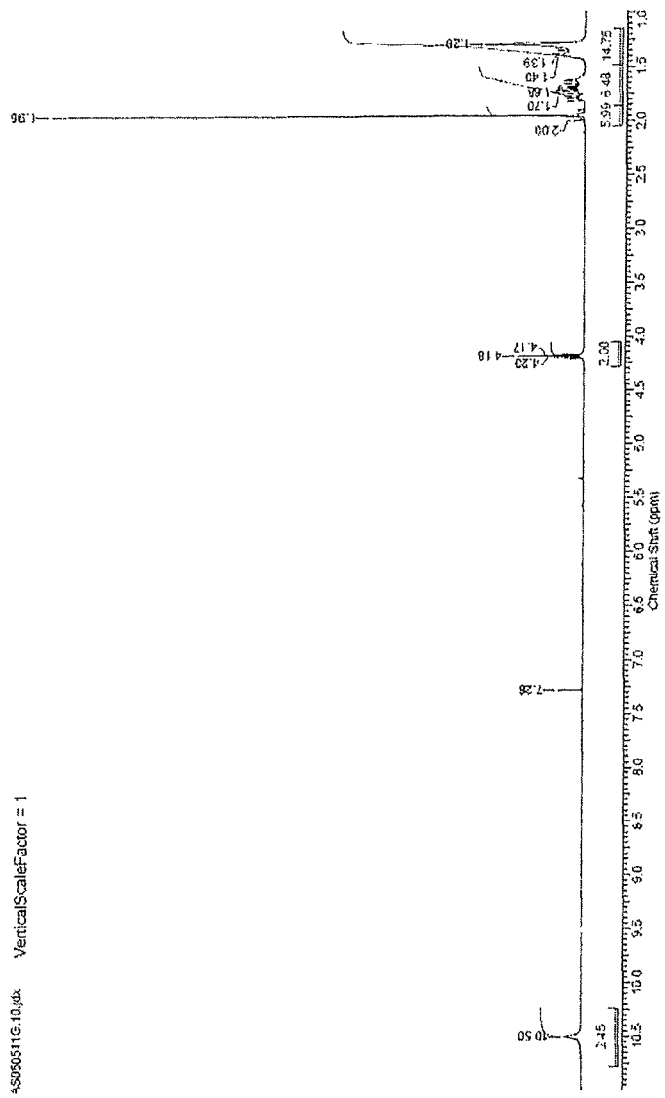
FIG. 10 is a proton ($^1$H) nuclear magnetic resonance (NMR) spectrum of 11-(2-bromoisobutyrate)-undecyl-1-phosphonic acid between 1 ppm to 11 ppm.
Figure 11:
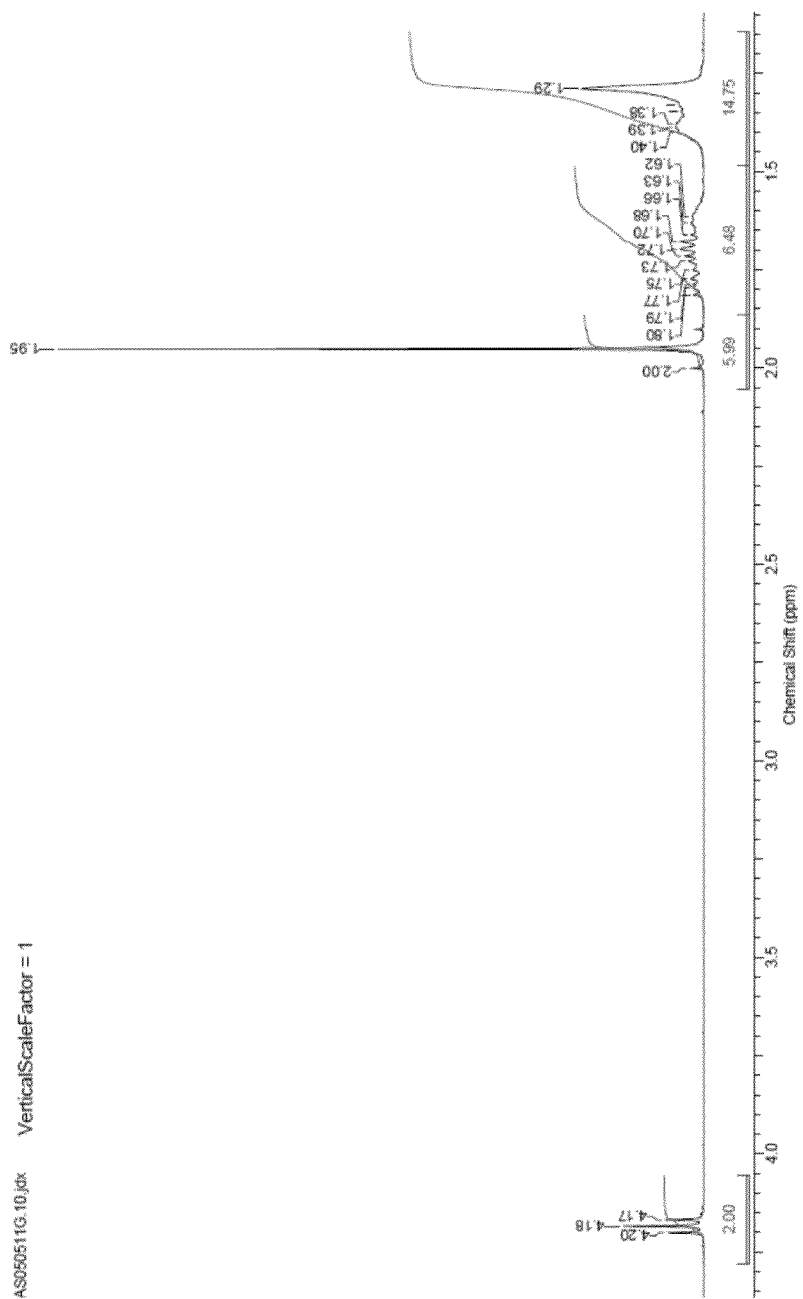
FIG. 11 is a proton ($^1$H) nuclear magnetic resonance (NMR) spectrum of 11-(2-bromoisobutyrate)-undecyl-1-phosphonic acid between 1.1 ppm to 4 ppm.
Figure 12:
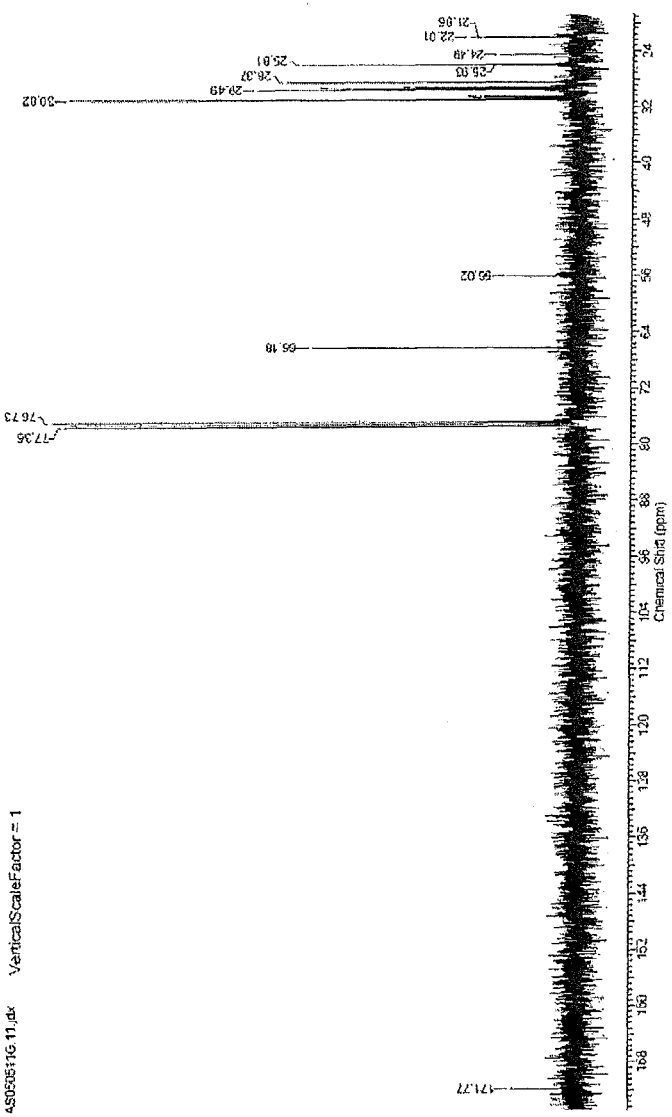
FIG. 12 is a carbon ($^{13}$C) nuclear magnetic resonance (NMR) spectrum of 11-(2-bromoisobutyrate)-undecyl-1-phosphonic acid.
Figure 13:
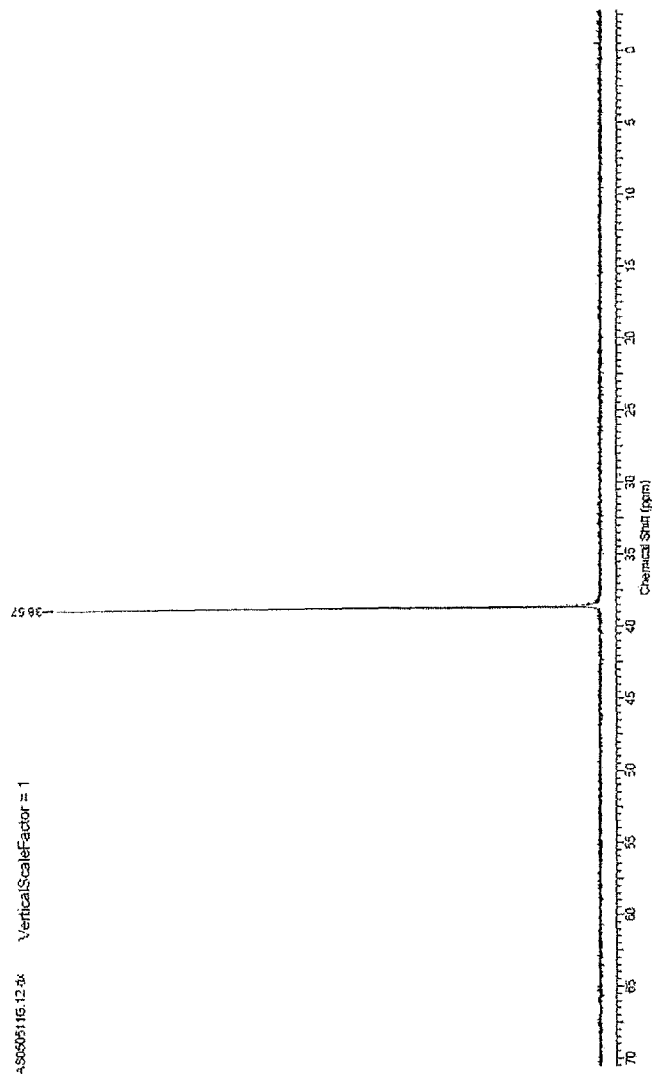
FIG. 13 is a phosphorous ($^{31}$P) nuclear magnetic resonance (NMR) spectrum of 11-(2-bromoisobutyrate)-undecyl-1-phosphonic acid.

In one embodiment of the disclosed method, the phosphonate compound having the general formula (I) can be synthesized in the steps as illustrated in FIG. 9. As shown in FIG. 9, a compound with the formula (XII) can be reacted with a compound with the following formula (VIII) to form a compound with the following formula (XVI).

(XVI)
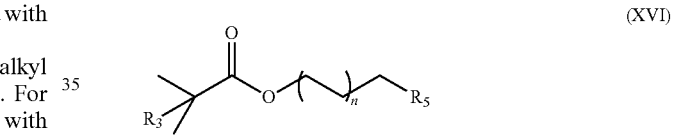

The compound with the formula (XVI) can be then reacted with an organophosphorous compound. The organophosphorous compound utilized can be trialkyl phosphite, triaryl phosphite, etc. For instance where triethyl phosphite is used, a compound with the formula (XIII) is obtained.

The compound with the formula (XIII) corresponds to the compound with the formula (I) where $R_1$ and $R_2$ are ethyl. The compound with the formula (XIV) can then be dealkylated to obtain the compound with the formula (I) where $R_1$ and $R_2$ are hydrogen.

In the above formulas (XII), (XIII), (XIV), and (XVI), $R_3$ is the same as described above for general formula (I). In formula (XII) $R_4$ is a halide group. In the formula (II), (III), (VII), (IX), (XVI) $R_5$ is a halide.

In one exemplary embodiment, the compound with the formula (XII) is 2-bromoisobutyryl-bromide, the compound with the formula (VIII) is 11-bromo-1-undecanol, the compound with the formula (XVI) is 11-bromoundecyl 2-bromoisobutyrate, the compound with the formula (XIII) is 11-(2-bromoisobutyrate)-undecyl-1-diethylphosphonate, and the compound with the formula (I) is 11-(2-bromoisobutyrate)-undecyl-1-phosphonic acid.

The disclosed method will now be described. In one example of a method for preparing the coated pigment 10, 51, the pigment 12, 54 can be dispersed in a solvent. The solvent can be any liquid suitable for dispersing the pigment 12, 54 and in which the phosphonate compound having the general structure (A) is soluble or miscible, and includes, glycol ether, glycol diether, propylene glycol methyl ether, dipropylene glycol n-propyl ether, dipropylene glycol n-butyl ether, lower alcohols such as ethanol and isopropyl alcohol, diethylene glycol dimethyl ether or diethylene glycol diethyl ether.

In one example, the amount of solvent added can be based on the amount of pigment that is used. In one instance, the pigment can be added in an amount of 0.1 to 90 weight percent of the solvent, and alternately, 1 to 10 weight percent of the solvent.

In one example of treating the pigment 12, 54 with the phosphonate compound having the general formula (I), the phosphonate compound can be used to treat a paste including the pigment 12, 54. Such pastes may be, for example, about 1% to 95% by weight, alternately 20% to 85%, of the pigment 12, 54 in mineral spirits or other solvents.

Any solvent or solvent system in which the phosphonate compound having the general formula (I) is soluble and which is compatible with the intended coating composition may be used. For example, the solvent or solvent system may include, but is not limited to, one or more of the following types of compounds: aliphatics, aromatics, nitroparaffins, alcohols, esters, aldehydes, ketones, ethers, glycol ethers, glycol ether acetates, carbonates, and pyrrolidones. In one instance, the solvent will be miscible with water, increasing the compatibility of the pigment 12, 54 paste with aqueous coating carriers or vehicles.

A milling process may be employed to form the coated pigment 10. In one example, a ball mill can be used. As a result of treating the pigment 12, 54 during milling, the surface of the pigment 12, 54 can be stabilized as the coated pigment 10, 51 is produced.

The pigment 12, 54 also may be treated in-situ during the production of an aqueous coating composition. Various mixing techniques may be employed in forming the coating composition.

In one example, the amount of the phosphonate compound added can be between 0.01% to 100%, preferably between 0.1% to 50%, and most preferably between 1% to 10% weight based on the weight of the pigment 12, 54.

Generally, treatment of the pigment 12, 54 with the phosphonate compound can be conducted at temperatures between −78° C. to 200° C., preferably between 0° C. to 100° C., and most preferably between 20° C. to 60° C. The time period for the pigment treatment is preferably between 15 minutes to 24 hours.

Once the above reaction has completed, the mixture can be treated to remove unreacted material, etc. by washing and/or drying. In one instance, the mixture contains at least 5% to 90% solids, and alternately, 10% to 70% solids.

In one example of producing the coated pigment 51, after the phosphonate compound or moieties is attached to the surface of the pigment 54 to form the treated pigment 82, 118, the treated pigment 82, 118 can be purified via filtration to remove any unbounded initiators before proceeding to the polymerization reaction. In another example where the existence of free initiators in solution does not significantly increase the solution viscosity or adversely alter other process conditions in the following polymerization, the reaction solution can be used directly without further purification.

In one example, living or controlled radical polymerization can be used to form the polymer chain 92, 122. Living or controlled radical polymerization, such as atom transfer radical polymerization (ATRP), nitroxide mediated polymerization, and reversible addition-fragmentation chain transfer polymerization, allows synthesis of polymer chains with controlled molecular weight, polydispersity, and architectures from many different types of monomers.

ATRP provides a facile method for the controlled radical polymerization of various monomers. ATRP generally employs dynamic equilibrium between free radicals and dormant species, which is strongly shifted toward the dormant species. One of the limitations of ATRP is that a relatively large amount of catalyst is needed to mediate polymerization and compensate for radical termination. This limitation is alleviated by using initiators for continuous activator regeneration (ICAR). Advantageously, ICAR ATRP can be carried out with relatively smaller amounts of the most active ATRP catalysts. In one example, the phosphonate compound is used as part of an ICAR ATRP system to produce the polymer coating 61.

The use of living polymerization allows the thickness of the polymer coating 61 to be controlled from a few nanometers up to hundreds of nanometers and further allows the structure of the polymer coating 61 to be controlled. Transmission electron microscopy can be used to directly observe the thickness of the coating. The coating of the polymer coating 61 can vary from about 10 nm to above 100 nm.

In one example, polymerization can involve dispersing the treated pigment 82, 118 in a monomer solution. The monomer solution can include one type of monomer or mixtures of different types of monomers. Examples of monomers that can be used include, but are not limited to, acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, perfluorocyclohexylmethyl methacrylate methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly(ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6- hexanediol diacrylate, 1,6-hexanediol dimethacrylate, 1,9-nonanediol dimethacrylate, 2,2-bis(4-methacryloxyphenyl) propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N,N' ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol)diacrylate, and poly(ethylene glycol)dimethacrylate.

Exemplary monomers that can be used include styrenes, (meth)acrylates, (meth)acrylamides, (meth)acrylic acids, acrylonitrile, vinylpyridines, maleimides, vinyl acetate, vinyl chloride, vinylidene chloride and isoprene. Following dispersion of the treated pigment 82, 118 into the monomer solution, polymerization from the initiator site 88, 127 leads to the formation of the polymer chain 92, 122.

As polymerization from the surface of the pigment 54 follows the same mechanism as solution polymerization, monomers that can be polymerized in solution polymerization can be directly adopted into the disclosed method.

The living nature of the controlled radial polymerization used in the disclosed method also enables the synthesis of the multiple layers of the polymer coating 61. In one example, a first set of monomers such as the monomers 89, 121 are used in a first polymerization reaction to form the polymer chain 92a, 122a. Then, a second set of monomers such as the monomers 98, 123 can be added to the reaction flask after a predetermined reaction time to form the polymer chain 92b, 122b. In the instance where the monomers 89, 121 are different from the monomers 98, 123, a second layer of the polymer coating 61 can be formed with a composition that is different from that of a first layer the polymer coating 61. The above steps can be repeated any number of times and in any different combinations to provide a multilayered coating.

In one embodiment, the coated pigment 10 and/or the coated pigment 51 may be used in a coating composition. The coating composition includes the coated pigment 10 and/or the coated pigment 51 and a carrier. The "carrier" component can include the base liquid or solvent, film-forming components, and related additives. Carriers include, but are not limited to, the following: acrylic emulsions, water reducible alkyl resin systems, water reducible alkyl/melamine cross-linked systems, waterborne epoxy systems, polyester emulsions, polyurethane dispersions, water reducible alkyd systems and water reducible polyester/melamine coatings.

In one embodiment, the coated pigment 10 and/or the coated pigment 51 may be used in a coating of an article. The article includes a coating that includes the coated pigment.

One of the advantages of the disclosed method is that it provides a facile route that addresses both passivation and dispersion properties. For example, as discussed above, two critical issues in effect pigments are passivation and dispersion. The disclosed method can address these two issues simultaneously by providing a coated pigment with both passivation and dispersion properties.

Moreover, the dispersion functionality of the treated pigment can be tailored according to the end use application or the solubility parameter of the free polymer.

Even further, the disclosed initiator can be used as part of an ICAR ATRP system to produce the polymer coating of the coated pigment 51.

EXAMPLES

Example 1

Synthesis of
11-(2-bromoisobutyrate)-undecyl-1-phosphonic acid

The following are the steps involved for Example 1:
Step 1

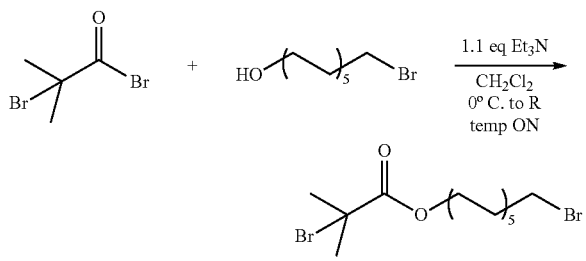

Step 2

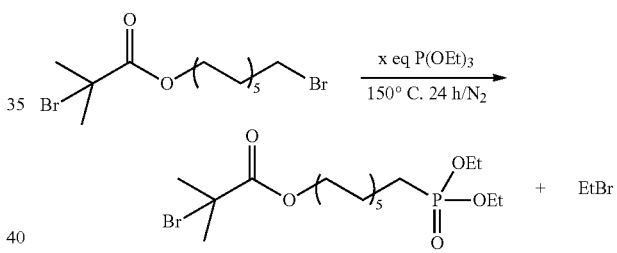

Step 3

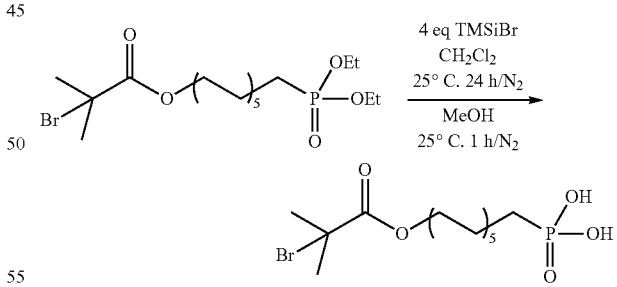

The following are the details of each of the steps.
Step 1

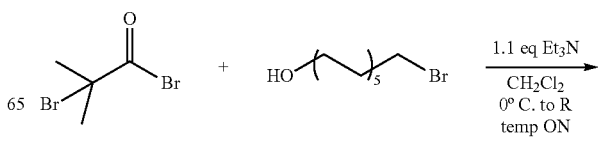

19

-continued

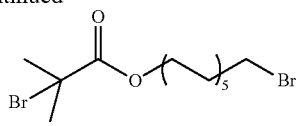

EXPERIMENT: Reaction of 11-bromo-undecanol with bromoisobutyryl bromide

PROCEDURE: The following reaction was carried out in a 2 liter reactor 3 neck flask under a flow of nitrogen. Flask was carefully cleaned and dried in oven.

Hot 2 L 3 neck flask was cooled under nitrogen ($N_2$), with an addition funnel set up.

The following components were added to the reaction flask and cooled to 5° C. in an ice bath.

150.0 g (0.6 mol) of 11-Bromo-undecanol (Purity=98%, m.w.=251.2)
60.0 g (0.6 mol) of Triethylamine (m.w.=101.19)
1 L of $CH_2Cl_2$ (m.w.=84.93, d=1.326)
$N_2$ was purged for 0.5 h in the mixture.

The following components were added to the flask (2-5° C.) drop-wise over 1 hour under $N_2$ purge with an addition funnel.

155.4 g (1.13 eq=0.68 mol) of bromoisobutyryl bromide (BrIBBr) (mw=229.90, d=1.86)

After complete addition of bromoisobutyryl bromide, the reaction mixture was allowed to mix in the ice-bath for additional 1 hour. Then, the ice-bath was removed and the temperature allowed to increase to room temperature and stirred overnight. The solution with solid salt appeared viscous; at a later stage, the stirring was slow.

The next day, the reaction mixture was cooled with ice/cold water and washed twice with 10% aqueous HCl solution and once with water. The organic fraction was dried over MgSO4, filtered, and further dried over rotatory evaporator. The product was then dried under full vacuum for 1 hour at 30° C.

Final product was obtained at >95% purity. Yield 95%
Step 2

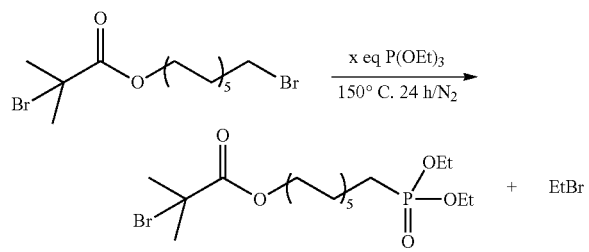

EXPERIMENT: Reaction of 11-bromoundecyl 2-bromoisobutyrate with triethyl phosphite PROCEDURE: The following reaction was carried out in a 1 liter reaction flask (1 neck) with a stir bar.
246.4 g (0.62 mol) of 11-bromoundecyl 2-bromoisobutyrate (MW=400.19 g/mol)
257.5 g (2.5 equivalent) of triethyl phosphite (MW=166.16)

1 liter 3 neck flask with a magnetic stir bar was used for the reaction. 246.4 g (0.62 mol, 400.19 g/mol) of 11-bromoundecyl 2-bromoisobutyrate was taken in the reaction flask. Then 257.5 g (2.5 eq, MW=166.16) of triethyl phosphite was added to the flask. The flask was slowly heated over 5 h to 145° C. and then left refluxing at this temperature for an additional 19 h. The reaction was then cooled back to room temperature.

20

Excess triethyl phosphite was distilled under high vacuum, at internal distillation temperature of 45° C. and heating mantle temperature of 90° C. over 5 h.

Final product was obtained after silica column chromatography with 1:1 hexane:$CH_2Cl_2$ at >97% purity. Yield 90%
Step3

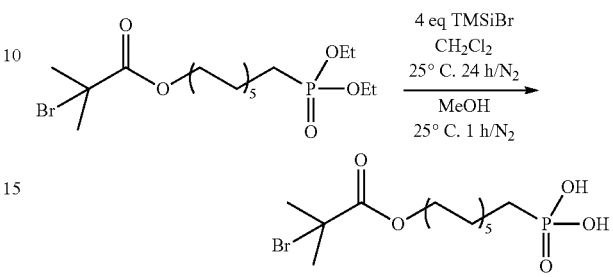

EXPERIMENT: Hydrolysis of 11-(2-bromoisobutyrate)-undecyl-1-diethylphosphonate with trimethylsilyl bromide and methanol PROCEDURE: The following reaction was carried out in a 2 L reactor 3 neck flask under a flow of nitrogen. Flask was carefully cleaned and dried in oven.

Hot 2 L 3 neck flask was cooled under nitrogen ($N_2$), with an addition funnel set up. The following components were added to the reaction flask and cooled to 5° C. in an ice bath.

500.0 g (1.09 mol) of 11-(2-bromoisobutyrate)-undecyl-1-diethylphosphonate (Purity=98%, m.w.=457.38)
1 L of dichloromethane ($CH_2Cl_2$ m.w.=84.93, d=1.326)
$N_2$ was purged through the reaction solution for 0.5 h and then purged as a blanket.

662 g (=570 mL; 4.36 mol=4 eq) of trimethylsilyl bromide (TMSiBr) (mw=151.97, d=1.16) was then added to the flask at 5° C. drop-wise over one hour with an addition funnel.

After complete addition of trimethylsilyl bromide, the reaction mixture was allowed to mix in the ice-bath for additional 1 hour. Then the ice-bath was removed and the temperature allowed to increase to room temperature and stirred overnight.

Then all the volatile components were pumped off at 40° C. under roto-evaporator over 2 h. The reaction solution was cooled with ice bath and 1000 ml of methanol was added over half hour.

After complete methanol addition, the ice bath was removed and the reaction mixture was mixed for additional 1 h at room temperature. Then all volatiles were pumped off under roto-evaporator over 2 h.

Crude half white material isolated at 92% purity at >98% yield.

The material was then further purified by washing from $CH_2Cl_2$ and Hexane (2:1)>92% pure product at 92-94% yield.

Nuclear magnetic resonance (NMR) spectrum of 11-(2-bromoisobutyrate)-undecyl-1-phosphonic acid was recorded on a JEOL spectrometer (JNM EX-400) for $^1H$ at 400 MHz and for $^{31}P$ at 376 MHz with complete proton decoupling at room temperature. See FIGS. 10 to 13 for NMR analysis.

Example 2

Synthesis of 11-(2-bromoisobutyrate)-undecyl-1-phosphonic acid

The following are the steps involved for Example 2. Steps 1 and 2 are the same as the above.

Step 1

Step 2

Step 3

Steps 1 and 2 are the same as the above. Details of step 3 are provided below.

Step 3

EXPERIMENT: Hydrolysis of 11-(2-bromoisobutyrate)-undecyl-1-diethylphosphonate with trimethylsilyl chloride and water.
Phosphonic ester (purity >95%, MW=457.38)=9.71 g (0.021 mol)
TMSiCl (MW=108.64, d=0.856)=8.7 g=10 ml (0.08 mol)
Cl-Benzene=20 mL
Water=20 mL Procedure:

Hot "pressure tube" was cooled under a flow a nitrogen ($N_2$). The following components were added under flow of nitrogen.

9.71 g of 11-(2-bromoisobutyrate)-undecyl-1-diethylphosphonate was added followed by 20 mL chloro-benzene. Then 10 mL of TMSiCl was added with a syringe slowly under nitrogen.

The flask was then sealed with Teflon screw cork cap.

The reaction was then enclosed in an explosion proof shield. The pressure tube flask was slowly heated to 140° C. and left at that temperature for 15 h.

The reaction flask was then removed from the heating bath and cooled to room temperature.

Then 20 ml of water was added slowly.

The reaction mixture was mixed for 1 h, white emulsion was formed.

After 1 h the reaction material was transferred into a 1 neck 100 ml flask for distillation.

Distillation was carried out for 2 h at 50° C. under high vacuum to remove solvent and water.

White waxy solid material was obtained.

Analysis 1H purity of crude material 92%.

Yield 94%

No further purification carried out on this material

Nuclear magnetic resonance (NMR) spectrum of 11-(2-bromoisobutyrate)-undecyl-1-phosphonic acid was recorded on a JEOL spectrometer (JNM EX-400) for $^1$H at 400 MHz and for $^{31}$P at 376 MHz with complete proton decoupling at room temperature.

Example 3

Synthesis of 11-(2-bromoisobutyrate)-undecyl-1-phosphonic acid

The following are the steps involved for Example 3:

Step 1

Step 2

23

-continued

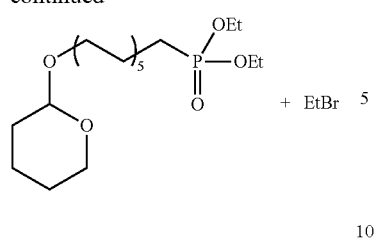
+ EtBr

Step 3

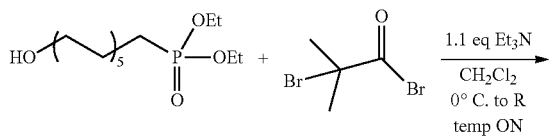

Step 4

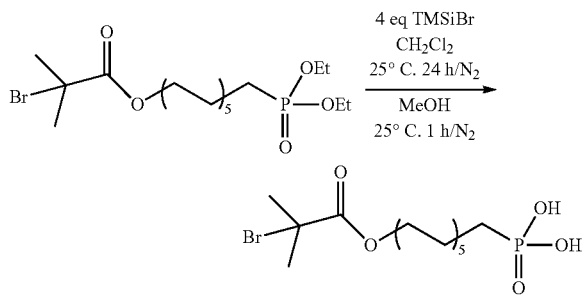

Step 5

The following are the details of each of the steps.

Step 1

 +

24

-continued

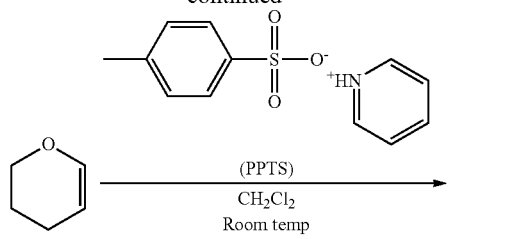

Alcohol Protection with Dihydropyran
Procedure:
The following components were added to a 4 L flask

| | |
|---|---|
| Bromoundecanol | 500 g (2.00 mol) |
| $CH_2Cl_2$, anhydrous (d = 1.326) | 2650 g (2.00 L) |
| Pyridinium p-toluenesulfonate (PPTS) | 50.0 g (0.20 mol) |
| Dihydropyran | 251 g (2.98 mol) |

Flask was capped, purged with $N_2$ for 30 min, and stirred at r.t. for overnight (bromoundecanol dissolves slowly over time, 20 min, after addition of all compound).

The reaction solution was then concentrated to about 1200 mL by increasing temperature <40° C. and distilling off dichloromethane, washed with water (half saturated with NaCl) twice, dried over $MgSO_4$ overnight, and concentrated to remove solvent and dihydropyran (b.p.=86° C.). 640.3 g obtained (96% yield, >96% purity)

Step 2

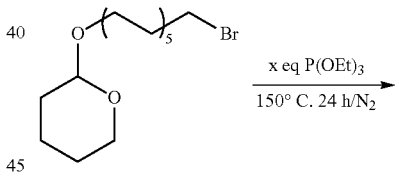

Protected Bromoundecanol with Triethyl Phosphite
Procedure:
The following components were added to a 2.0 L 3-neck round bottom flask
Protected bromoundecanol (m.w.=335.32) 570 g (1.70 mol)
Triethyl phosphite, $(EtO)_3P$ (m.w.=166.16) 697 g (2.47×1.70 mol)

Large refluxing condenser was placed with $N_2$ inlet and outlet.

While flowing $N_2$ relatively fast from the inlet of flask, temperature was increased slowly to reflux triethyl phosphite and left overnight, 20 h external temp was 155° C.-145° C.

In the first several hours (up to about 4 h) when the temperature was increased to 155° C. and maintained, very rapid boiling and reflux were observed.

After reaction, medium was cooled to room temperature (r.t.) and vacuum distilled leftover triethyl phosphite using strong vacuum pump. Temperature was increased very little. (Distilled at 40° C. and outside temp was around 60° C.).

Total 663.6 g obtained (99.5% yield, >96% purity)

Step 3

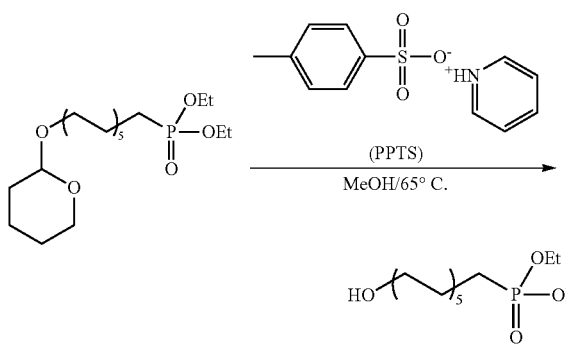

Deprotection of diethyl 11-(tetrahydro-2H-pyran-2-yloxy)undecylphosphonate with pyridinium p-toluenesulfonate (PPTS)

Procedure:

The following components were added to a 2 L 3-neck round bottom flask

Protected alcohol diethyl phosphonic ester (m.w.=392.51) 353 g (0.8993 mol)

MeOH (d=0.791, b.p.=64.7° C.) 706 g (892.5 mL)

p-toluenesulfonic acid monohydrate (p-TsOH, m.w.=190.2) 51.3 g (0.2697 mol=0.3 eq)

The flask was sealed, connected with condenser, and refluxed at 65° C. for 5 hours. Temps inside and outside were monitored.

After cooling to r.t., 0.6 eq (45.3 g) of NaHCO$_3$ (sodium bicarbonate, m.w. 84.01) was added and stirred for 30 min to quench the reaction (bubbles were evolved for 10 min and stopped).

The mixture was concentrated on Rotavap, added 300 mL of CH$_2$Cl$_2$, washed with water 3 times (300 mL×3), dried over MgSO$_4$, filtered, and concentrated (evaporated solvent and 3 h drying at 85° C.).

276.6 g obtained (99.7% yield, >96% purity)

Step 4

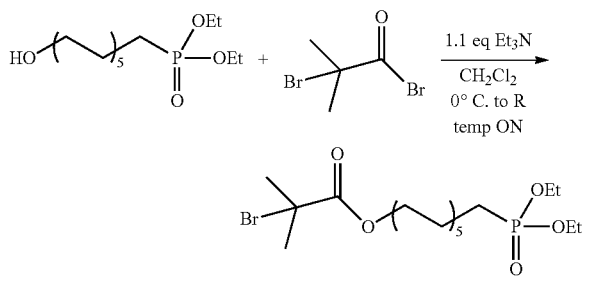

Bromoisobutyryl bromide (BrIBBr) with diethyl(11-hydroxyundecyl)phosphonic ester Procedure:

The following components were added to a 250 mL 1-neck round bottom flask and cooled to 5° C. in an ice bath. N$_2$ was purged for 0.5 h in the mixture.

20.0 g (0.06485 mol) of diethyl(11-hydroxyundecyl)phosphonic ester (Purity=94-99%, m.w.=308.39)

7.22 g (1.1 eq) of triethylamine (m.w.=101.19)

150 g (113.1 mL) of CH$_2$Cl$_2$ (m.w.=84.93, d=1.326)

The following components were added to the flask (2-5° C.) drop-wise over 20 min under N$_2$ purge.

BrIBBr (mw=229.90, d=1.86) 16.4 g (0.07134=1.1 eq)

When BrIBBr was added slowly over 1 min, white precipitation was observed and the amount increased gradually. After complete addition of BrIBBr, ice-bath was removed and allowed to increase to r.t. and stirred overnight. The solution with solid salt looked viscous but stirred relatively well.

The next day, salts were filtered off. Filtrates was washed 3 times with 100 mL of DI water, dried over MgSO$_4$, filtered, and further dried over Rotavap (80° C. for 1 h for final intensive dry). 30.3 g obtained (>92% purity with 8% starting material, bromoisobutyric acid)

Step 5

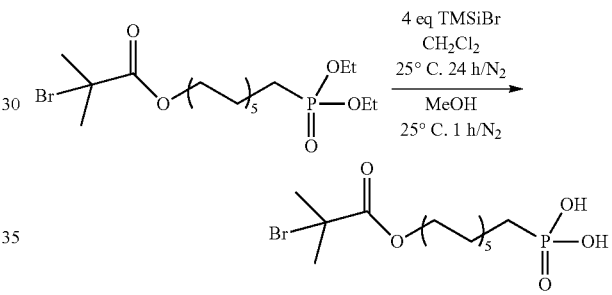

Phosphonic ester (MW=457.38)=500 g (1.09 mol)

TMSiBr (MW=151.97, d=1.16)=662 g=570 ml (4.36 mol)

CH$_2$Cl$_2$=1 L

Methanol=1 L

Hot 2 L 3 neck flask was cooled under nitrogen (N$_2$), with an addition funnel set up. The following components were added to the reaction flask and cooled to 5° C. in an ice bath.

11-(2-bromoisobutyrate)-undecyl-1-diethylphosphonate (m.w.=457.38) 500.0 g (1.09 mol)

Dichloromethane (CH$_2$Cl$_2$, m.w.=84.93, d=1.326)=1 L

N$_2$ was purged for 0.5 h in the mixture.

The following component was then added to the flask (5° C.) drop-wise over 1 hour under N$_2$ purge with a addition funnel.

Trimethylsilyl bromide (TMSiBr) (mw=151.97, d=1.16) =662 g=570 mL (4.36 mol=4 eq)

After complete addition of trimethylsilyl bromide, the reaction mixture was allowed to mix in the ice-bath for additional 1 hour. Then the ice-bath was removed and the temperature allowed to increase to room temperature and stirred overnight.

Then all the volatile components were pumped off at 40° C. under roto-evaporator over 2 h. The reaction solution was cooled with ice bath and 1000 ml of methanol was added over half hour.

After complete methanol addition the ice bath was removed and the reaction mixture was mixed for additional 1 h at room temperature. Then all volatiles pumped off under roto-evaporator over 2 h.

Crude half white material isolated at 92% purity at >98% yield.

The material was then further purified by washing from CH$_2$Cl$_2$ and hexane (2:1)>92% pure product at 92-94% yield.

Example 4

Synthesis of 11-(2-bromoisobutyrate)-undecyl-1-phosphonic acid

The following are the steps involved for Example 4.
Step 1

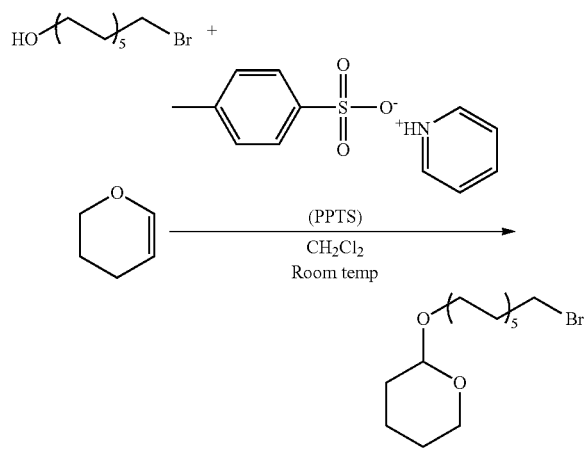

Step2

Step3

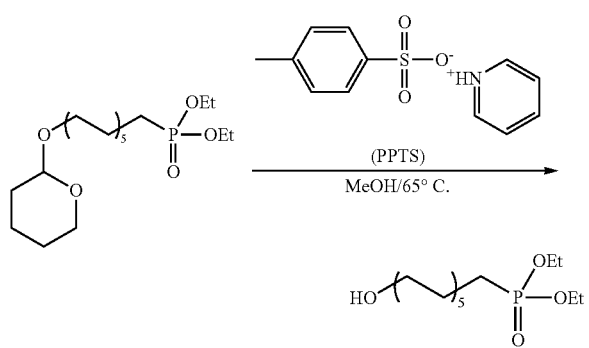

Step4

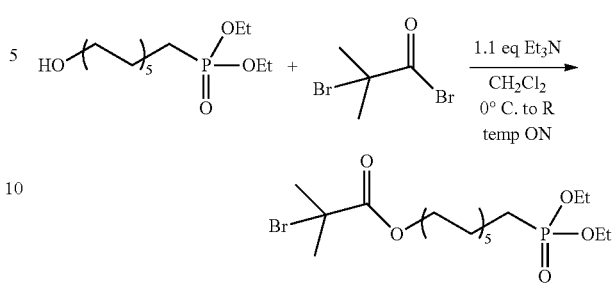

Step5

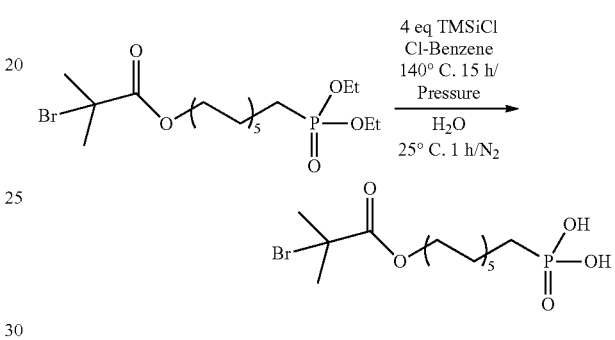

Steps 1-4 are the same as in Example 3. Details of step 5 are as follows.
Step 5

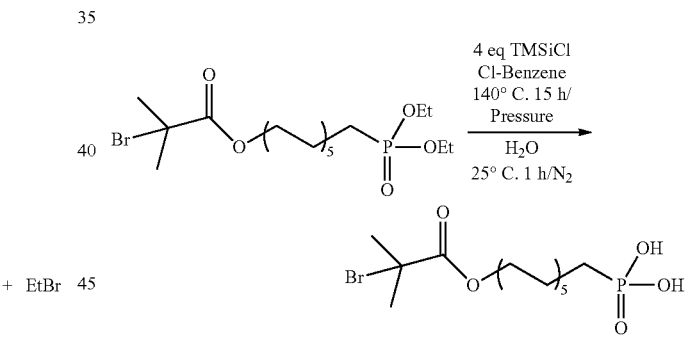

EXPERIMENT: Hydrolysis of 11-(2-bromoisobutyrate)-undecyl-1-diethylphosphonate with trimethylsilyl chloride and water.
Phosphonic ester (MW=457.38)=9.71 g (0.021 mol)
TMSiCl (MW=108.64, d=0.856)=8.7 g=10 ml (0.08 mol)
Cl-Benzene=20 mL
Water=20 mL
Procedure:

Hot "pressure tube" was cooled under a flow of nitrogen gas (N$_2$). The following components were added under flow of nitrogen.

9.71 g of 11-(2-bromoisobutyrate)-undecyl-1-diethylphosphonate was added followed by 20 mL chloro-benzene. Then 10 mL of TMSiCl was added with a syringe slowly under nitrogen.

The flask was then sealed with Teflon screw cork cap.

The reaction was then enclosed in an explosion proof shield. The pressure tube flask was slowly heated to 140° C. and left at that temperature for 15 h.

The reaction flask was then removed from the heating bath and cooled to room temperature.

Then 20 ml of water was added slowly.

The reaction mixture was mixed for 1 h, white emulsion was formed.

After 1 h the reaction material was transferred into a 1 neck 100 ml flask for distillation.

Distillation was carried out for 2 h at 50° C. under high vacuum to remove solvent and water.

White waxy solid material obtained.

Analysis 1H purity of crude material 92%.

Yield 94%

No further purification carried out on this material

Example 5

Preparation of Waterborne Masstone Coating Containing Sparkle Silver Ultra (SSU) 6605 with In Situ Treatment of Product Obtained in Example 1 to 4

SSU 6605 Aluminum Pigment (Silberline, aluminum content 80%) is dispersed in solvent containing the product from any of examples 1 to 4 in the amount equimolar to 3% of octyl phosphonic acid (OPA) based on the weight of aluminum metal and then incorporated into a waterborne polyurethane coating formulation such that the weight of the aluminum particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 1.

Comparative Example 5a

Preparation of Waterborne Masstone Coating Containing Sparkle Silver Ultra (SSU) 6605 with In Situ Octyl Phosphonic Acid (OPA) Treatment SSU 6605 Aluminum Pigment (Silberline, aluminum content 80%) is dispersed in solvent containing octyl phosphonic acid (OPA) in the amount of 3% of the weight of aluminum metal and then incorporated into a waterborne polyurethane coating formulation such that the weight of the aluminum particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 1.

TABLE 1

Gassing Results - Masstone

|  | 40° C. Gassing (mL) - 7 days | 40° C. Gassing (mL) - 28 days |
|---|---|---|
| Comparative Example 5a | 0 | 5.7 |
| Example 5 | 0 | 0 |

Example 6

Preparation of Waterborne Masstone Coating Containing Sparkle Silver Premier E2154 with Insitu Treatment of Product Obtained in Example 1 to 4

E2154 Aluminum Pigment (Silberline, aluminum content 65%) is dispersed in solvent containing the product from any of examples 1 to 4 in the amount equimolar to 3% of octyl phosphonic acid (OPA) based on the weight of aluminum metal and then incorporated into a waterborne polyurethane coating formulation such that the weight of the aluminum particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 2.

Comparative Example 6a

Preparation of Waterborne Masstone Coating Containing Sparkle Silver Premier E2154 with Insitu Octyl Phosphonic Acid (OPA) Treatment E2154 Aluminum Pigment (Silberline, aluminum content 65%) is dispersed in solvent containing octyl phosphonic acid (OPA) in the amount of 3% of the weight of aluminum metal and then incorporated into a waterborne polyurethane coating formulation such that the weight of the aluminum particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 2.

TABLE 2

Gassing Results - Masstone

|  | 40° C. Gassing (mL) - 7 days | 40° C. Gassing (mL) - 28 days |
|---|---|---|
| Comparative Example 6a | 0.1 | 4.7 |
| Example 6 | 0 | 0 |

Example 7

Preparation of Waterborne Coating Containing Sparkle Silver Ultra (SSU) 6605 with Insitu Treatment of Product Obtained in Example 1 to 4 and Red Iron Oxide Pigment Particles SSU 6605 Aluminum Pigment (Silberline, aluminum content 80%) is dispersed in solvent containing the product from any of examples 1 to 4 in the amount equimolar to 3% of octyl phosphonic acid (OPA) based on the weight of aluminum metal and then incorporated into a waterborne polyurethane coating formulation along with a dispersion of red iron oxide particles, such that the weight ratio of the aluminum pigment to red iron oxide was 80:20 and the combined weight of particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 3.

Comparative Example 7a

Preparation of Waterborne Coating Containing Sparkle Silver Ultra (SSU) 6605 with Insitu Octyl Phosphonic Acid (OPA) Treatment and Red Iron Oxide Pigment Particles SSU 6605 Aluminum Pigment (Silberline, aluminum content 80%) is dispersed in solvent containing octyl phosphonic acid (OPA) in the amount of 3% of the weight of aluminum metal and then incorporated into a waterborne polyurethane coating formulation along with a dispersion of red iron oxide particles, such that the weight ratio of the aluminum pigment to red iron oxide was 80:20 and the combined weight of particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 3.

TABLE 3

Gassing Results - RIO

|  | 40° C. Gassing (mL) - 7 days | 40° C. Gassing (mL) - 28 days |
| --- | --- | --- |
| Comparative Example 7a | 2.6 | 3.8 |
| Example 7 | 0.7 | 2.5 |

Example 8

Preparation of Waterborne Coating Sparkle Silver Premier E2154 with Insitu Treatment of Product Obtained in Example 1 to 4 and Red Iron Oxide Pigment Particles E2154 Aluminum Pigment (Silberline, aluminum content 65%) is dispersed in solvent containing the product from any of examples 1 to 4 in the amount equimolar to 3% of octyl phosphonic acid (OPA) based on the weight of aluminum metal and then incorporated into a waterborne polyurethane coating formulation along with a dispersion of red iron oxide particles, such that the weight ratio of the aluminum pigment to red iron oxide was 80:20 and the combined weight of particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 4.

Comparative Example 8a

Preparation of Waterborne Coating Sparkle Silver Premier E2154 with Insitu Octyl Phosphonic Acid (OPA) Treatment and Red Iron Oxide Pigment Particles E2154 Aluminum Pigment (Silberline, aluminum content 65%) is dispersed in solvent containing octyl phosphonic acid (OPA) in the amount of 3% of the weight of aluminum metal and then incorporated into a waterborne polyurethane coating formulation along with a dispersion of red iron oxide particles, such that the weight ratio of the aluminum pigment to red iron oxide was 80:20 and the combined weight of particles was equal to 22% of the weight of resin. Two hundred grams of paint was weighed into a flask. The flask was placed in an oil bath maintained at a temperature of 40° C. and the evolved gas was collected in an inverted water-filled buret for a period of 28 days. The gassing data is summarized in Table 4.

TABLE 4

Gassing Results - RIO

|  | 40° C. Gassing (mL) - 7 days | 40° C. Gassing (mL) - 28 days |
| --- | --- | --- |
| Comparative Example 8a | 5.8 | 17.3 |
| Example 8 | 1.9 | 2.6 |

The experimental data provided in Table 1 and 2 demonstrates that in masstone systems, the disclosed phosphonate compound is more effective than OPA at reducing the amount of hydrogen gas that is evolved when the aluminum flakes are brought into contact with an aqueous medium. The experimental data provided in Table 3 and 4 demonstrates that in RIO systems, the disclosed phosphonate compound is more effective than OPA at reducing the amount of hydrogen gas that is evolved when the aluminum flakes are brought into contact with an aqueous medium.

Example 9

Preparation of Silberline Sparkle Silver Ultra® 6704 Aluminum Pigment (Silberline, Aluminum Content 77%) Treated with Product Obtained in Example 1, 2, 3 or 4

Procedure

The following reaction was carried out in the fume hood, using a 2 L reaction flask equipped with a mechanical stirrer and a heating mantle and connected to a tank of nitrogen. Nitrogen was bubbled at 3 LPM with a fritted bubbler.

To the reactor flask, added:

| Al flakes (SSU-6704) | 64.9 g (50.0 g of Al) |
| --- | --- |
| 11-(2-bromoisobutyrate)-phosphonic acid | 3.0 g (6 wt %, 7.48 mmoles) |
| Mineral spirits | 900 g |

The lid openings were sealed with septa and Teflon grease between lid and body. The mixture above was sealed into the reactor as quickly as possible to minimize water absorption, agitation started at about 600 RPM, and the slurry was bubbled with nitrogen for 12 hours at 3 LPM.

After the reaction time the inhibitor-initiator coated pigment (SSU 6704) can be used as it is for polymer grafting.

Example 10

Preparation of Polymer Coated Silberline Sparkle Silver Ultra 6704

To the reaction flask containing the inhibitor-initiator coated pigment (SSU-6704) of Example 9, the following reagents were added:

| Catalyst (CuBr) | 0.20 g (1.39 mmoles) |
| --- | --- |
| Monomer 1 (methyl methacrylate) | 22.5 g |
| Monomer 2 (2-hydroxyethyl methacrylate) | 2.5 g |

Agitation was increased to about 700 RPM, and the slurry was degassed with nitrogen for 60 min while heating to 60° C.

In a separate flask, pentamethyldiethylenetriamine (PMDETA) ligand was degassed with nitrogen for 60 min. After purging the slurry for one hour and the temperature was stable, 0.3 ml of degassed PMDETA was transferred to the reaction flask (under a nitrogen sweep) with a nitrogen purged syringe.

Reaction was run for total of 40 minutes at 60° C. After this time, the reaction was quickly cooled down in an ice bath and filtered over a Buchner funnel and washed with 540 grams of mineral spirits. The filter cake was collected and mixed in the container and the % solids measured as 77.3%. The amount of organic polymer on the pigment was measured by thermogravimetric analysis as 6.48% of the total weight of solid material.

Comparative Example 10a

Preparation of Silberline Sparkle Silver Ultra® 6704 Aluminum Pigment (Silberline, Aluminum Content 77%) Treated with Octyl Phosphonic Acid Procedure The following reaction was carried out in the fume hood, using a 2 L reaction flask equipped with a mechanical stirrer and a heating mantle and connected to a tank of nitrogen. Nitrogen was bubbled at 3 LPM with a fritted bubbler.

To the reactor flask, added:

| Al flakes (SSU-6704) | 64.9 g (50.0 g of Al) |
| Octyl phosphonic acid | 1.5 g (3 wt %, 7.48 mmoles) |
| Mineral spirits | 900 g |

The lid openings were sealed with septa and Teflon grease between lid and body. The mixture above was sealed into the reactor as quickly as possible to minimize water absorption, agitation started at about 600 RPM, and the slurry was bubbled with nitrogen for 12 hours at 3 LPM. After this time, the reaction slurry was filtered over a Buchner funnel and washed with 540 grams of mineral spirits. The filter cake was collected and mixed in the container and the % solids measured as 71.0%. The amount of octyl phosphonic acid on the pigment was measured by thermogravimetric analysis as 1.40% of the total weight of solid material.

Evaluation

The products of Example 10 and Comparative Example 10a were incorporated into a waterborne acrylic coating formulation such that the weight of the aluminum particles was equal to 13% of the weight of the finished paint. Two hundred grams of paint was weighed into a flask. The flask was placed in an oil bath maintained at a temperature of 40° C. and the evolved gas was collected in an inverted water-filled buret for a period of 10 days. The remaining paint was applied using electrostatic spraying to steel panels pre-coated with an electrocoat and a primer. The aesthetics of the panels were tested for colorimetry (most importantly the L* brightness value at a 15 degree near-specular angle) using an X-Rite MA 68 II goniospectrophotometer, for gloss at a 20 degree angle using a Byk micro-TRI-gloss meter, and for Distinctness of Image (DOI) using a DOI Light Box. Adhesion of the paint film was measured using cross-cut tape adhesion per ASTM D3359-08. The painted panels were then placed in a humidity chamber at 100° F. and 100% relative humidity for a period of 10 days. Immediately upon removal from the humidity chamber, the adhesion, change in gloss, and change in DOI were measured to determine the humidity resistance of the treated pigment in the paint film. Data is contained in Table 5.

| | Example 10 | Comparative Example 10 |
|---|---|---|
| Gassing, 10 days 40° C.; mLs | 0.50 | 12.10 |
| L*, 15 degrees | 124.28 | 120.86 |
| Adhesion, Initial | 4B, <5% loss | 3B, 5-15% loss |
| Adhesion, 10 days humidity | 4B, <5% loss | 1B, 35-65% loss |
| Δ DOI, 10 days humidity | 0 | −50 |
| Δ 20° Gloss, 10 days humidity | 1.55 | −5.90 |

The experimental data in Table 5 shows that the disclosed phosphonate/polymer composition is superior to previous phosphonic acid treatments for water resistance in an aqueous paint (per the lower gassing value), for dispersion in an aqueous paint (per the increased brightness arising from improved flake orientation), for compatibility with the aqueous paint resin (per the greater initial adhesion), and for humidity resistance of the final paint film (per the lesser change in the adhesion, DOI, and 20° gloss after high humidity storage).

While the disclosed coated pigments and methods have been described in conjunction with a preferred embodiment, it will be apparent to one skilled in the art that other objects and refinements of the disclosed coated pigments and methods may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:

1. A coated pigment, comprising:
a metal substrate that comprises aluminum; and
an organic layer surrounding the metal substrate, the organic layer including a phosphonate compound having the following formula (I)

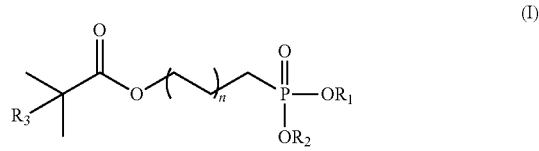

where each of $R_1$ and $R_2$ is selected from the group consisting of hydrogen, optionally substituted alkyl, optionally substituted cycloalkyl, optionally substituted aryl, optionally substituted alkenyl, optionally substituted amine, polyether, an ammonium ion, an alkali metal and an alkaline earth metal, $R_1$ and $R_2$ can be the same or different, $R_3$ is a halogen group, an N-oxyl group, or a dithiocarbonyl group and n is 1 to 100.

2. The coated pigment of claim 1, wherein the metal substrate is coated with a metal oxide layer comprising a metal oxide or a mixture of metal oxides, the metal oxide being an oxide of aluminum, silicon, titanium, zirconium, copper, zinc, tin, iron, molybdenum or manganese; or an organic-inorganic hybrid layer comprising the metal oxide or the mixture of the metal oxides that are crosslinked through organic linkers.

3. The coated pigment of claim 1, wherein the coated pigment includes the phosphonate compound in an amount sufficient to provide a passivation property to the coated pigment.

4. The coated pigment of claim 1, further comprising a coating that includes a polymer chain, wherein the polymer chain is attached to the phosphonate compound.

5. The coated pigment of claim 4, wherein the coating includes a plurality of layers, each of the layers including polymer chains.

6. The coated pigment of claim 4, wherein the coating includes the polymer chain in an amount sufficient to provide a dispersion property to the coated pigment.

7. The coated pigment of claim 5, wherein a composition of the polymer chains in each of the layers is different from one another.

8. The coated pigment of claim 1, wherein the compound is 11-(2-bromoisobutyrate)-undecyl-1-phosphonic acid.

9. A coating composition, comprising:
the coated pigment of claim 1; and
a carrier.

10. An article, comprising:
a coating that comprises the coated pigment of claim 1.

11. A method of producing a coated metal pigment, comprising:
providing a phosphonate compound having the formula (I)

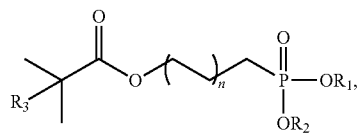
(I)

where each of $R_1$ and $R_2$ is selected from the group consisting of hydrogen, optionally substituted alkyl, optionally substituted cycloalkyl, optionally substituted aryl, optionally substituted alkenyl, optionally substituted amine, polyether, an ammonium ion, an alkali metal and an alkaline earth metal, $R_1$ and $R_2$ can be the same or different, $R_3$ is a halogen group, an N-oxyl group, or a dithiocarbonyl group and n is 1 to 100, and
treating a composition comprising a metal pigment with the phosphonate compound so as to produce the coated metal pigment,
wherein the metal pigment comprises aluminum.

12. The method of claim 11, wherein the phosphonate compound is 11-(2-bromoisobutyrate)-undecyl-1-phosphonic acid.

13. The method of claim 11, further comprising polymerizing one or more polymerizable monomers from an initiator site formed by an initiator moiety so that the one or more polymerizable monomers are added to the initiator site and form a polymer chain attached to the surface of the metal pigment, wherein the polymer chain has a chain terminus that is capable of being reversibly activated so as to initiate further polymerization.

14. The method of claim 13, wherein the coated pigment is purified after the polymerization reaction.

15. The method of claim 13, wherein a first set of monomers is added to the initiator site to form a first polymer chain, the method further comprising polymerizing a second set of monomers so that the second set of monomers is added to a chain terminus of the first polymer chain to form a second polymer chain.

16. The method of claim 13, wherein the one or more monomers are polymerized by an initiators for continuous activator regeneration-atom transfer radical polymerization (ICAR-ATRP).

17. A coated pigment, comprising:
a metal substrate;
an organic layer surrounding the metal substrate, the organic layer including a phosphonate compound having the following formula (A)

(A)

where each of $R_1$ and $R_2$ is selected from the group consisting of hydrogen, optionally substituted alkyl, optionally substituted cycloalkyl, optionally substituted aryl, optionally substituted alkenyl, optionally substituted amine, polyether, an ammonium ion, an alkali metal and an alkaline earth metal, $R_1$ and $R_2$ can be the same or different, X is selected from the group consisting of (a) a straight or branched hydrocarbon chain, the hydrocarbon chain optionally including a heteroatom in the primary chain and optionally being partially or wholly saturated or unsaturated, (b) an optionally substituted carbocyclic ring, wherein the carbocyclic ring is selected from the group consisting of cycloalkyl, cycloalkenyl, aryl and fused carbocyclic group and (c) an optionally substituted heterocyclic ring, where the heterocyclic ring includes one or more heteroatoms selected from the group consisting of O, S and N, n represents the number of carbon atoms and heteroatoms contained in X and is an integer from 1 to 100, and Y is a halogen group, an N-oxyl group, or a dithiocarbonyl group; and
a coating that includes a polymer chain, wherein the polymer chain is attached to the phosphonate compound, and wherein the coating includes a plurality of layers, each of the layers including polymer chains.

18. A method of producing a coated metal pigment, comprising:
providing a phosphonate compound having the following formula (A):

(A)

where each of $R_1$ and $R_2$ is selected from the group consisting of hydrogen, optionally substituted alkyl, optionally substituted cycloalkyl, optionally substituted aryl, optionally substituted alkenyl, optionally substituted amine, polyether, an ammonium ion, an alkali metal and an alkaline earth metal, $R_1$ and $R_2$ can be the same or different, X is selected from the group consisting of (a) a straight or branched hydrocarbon chain, the hydrocarbon chain optionally including a heteroatom in the primary chain and optionally being partially or wholly saturated or unsaturated, (b) an optionally substituted carbocyclic ring, wherein the carbocyclic ring is selected from the group consisting of cycloalkyl, cycloalkenyl, aryl and fused carbocyclic group and (c) an optionally substituted heterocyclic ring, where the heterocyclic ring includes one or more heteroatoms selected from the group consisting of O, S and N, n represents the number of carbon atoms and heteroatoms contained in X and is an integer from 1 to 100, and Y is a functional group that is capable of forming an initiator site for a polymerization reaction in the presence of polymerizable monomers or macromonomers, and is a halogen group, an N-oxyl group, or a dithiocarbonyl group, and treating a composition comprising a metal pigment with the phosphonate compound so as to produce the coated metal pigment, wherein a first set of monomers is added to the initiator site to form a first polymer chain, the method further comprising polymerizing a second set of monomers so that the second set of monomers is added to a chain terminus of the first polymer chain to form a second polymer chain.

* * * * *